United States Patent
Proctor, Jr. et al.

(10) Patent No.: US 11,238,499 B2
(45) Date of Patent: *Feb. 1, 2022

(54) PROXIMITY DETECTION, VIRTUAL DETECTION, OR LOCATION BASED TRIGGERING OF THE EXCHANGE OF VALUE AND INFORMATION

(71) Applicant: Proctor Consulting, LLC, Indialantic, FL (US)

(72) Inventors: James A. Proctor, Jr., Indialantic, FL (US); James Arthur Proctor, III, Indialantic, FL (US); Maria Elena Tripoli, Merrit Island, FL (US)

(73) Assignee: Proctor Consulting, LLC

( * ) Notice: Subject to any disclaimer, the term of this patent is extended or adjusted under 35 U.S.C. 154(b) by 0 days.

This patent is subject to a terminal disclaimer.

(21) Appl. No.: 16/998,044

(22) Filed: Aug. 20, 2020

(65) Prior Publication Data

US 2021/0035161 A1 Feb. 4, 2021

Related U.S. Application Data

(63) Continuation of application No. 16/247,669, filed on Jan. 15, 2019, now Pat. No. 10,762,532, which is a
(Continued)

(51) Int. Cl.
*G06Q 30/02* (2012.01)
*G06Q 20/20* (2012.01)
(Continued)

(52) U.S. Cl.
CPC ....... *G06Q 30/0266* (2013.01); *G06Q 20/123* (2013.01); *G06Q 20/202* (2013.01);
(Continued)

(58) Field of Classification Search
CPC .... G06Q 30/0266; H04W 4/80; H04N 21/812
(Continued)

(56) References Cited

U.S. PATENT DOCUMENTS

| | | | |
|---|---|---|---|
| 8,332,521 | B2 | 12/2012 | Chang et al. |
| 10,133,527 | B2 | 11/2018 | Chang et al. |

(Continued)

*Primary Examiner* — Luna Champagne
(74) *Attorney, Agent, or Firm* — David J. Thibodeau, Jr.; VLP Law Group LLP

(57) ABSTRACT

A system, methods, and apparatuses are provided for valuation and exchange of stored value assets, information of value, and the transfer of value to or among individuals. The exchanged assets may be of a similar nature, e.g., music files exchanged for other music files, and exchange or trade of information such as rewards value or a restaurant coupon. The exchanged assets may also be other dissimilar assets exchanged between individuals and/or entities. The exchange may be initiated in numerous ways such as after completing a review, exchanging or trading a gift card, a prepaid card, a reward card, a coupon, a ticket, a pass, and/or the like when in proximity to a specific location or a location of some type or category, and/or exchanging or trading of other assets between individuals based on one or more constraints such as time, location, need, desire for the assets, and/or proximity.

15 Claims, 12 Drawing Sheets

Related U.S. Application Data continuation of application No. 15/275,653, filed on Sep. 26, 2016, now Pat. No. 10,204,357, which is a continuation of application No. 14/828,742, filed on Aug. 18, 2015, now Pat. No. 9,460,433, which is a continuation of application No. 13/449,208, filed on Apr. 17, 2012, now Pat. No. 9,135,612.

(60) Provisional application No. 61/476,296, filed on Apr. 17, 2011.

(51) Int. Cl.
*H04W 4/80* (2018.01)
*G06Q 20/12* (2012.01)
*G06Q 20/22* (2012.01)
*G06Q 20/38* (2012.01)
*G06Q 30/06* (2012.01)
*G06Q 20/32* (2012.01)
*G06Q 20/40* (2012.01)
*H04B 5/00* (2006.01)

(52) U.S. Cl.
CPC ....... *G06Q 20/223* (2013.01); *G06Q 20/3278* (2013.01); *G06Q 20/381* (2013.01); *G06Q 20/401* (2013.01); *G06Q 30/06* (2013.01); *H04B 5/0031* (2013.01); *H04W 4/80* (2018.02)

(58) Field of Classification Search
USPC .................................. 705/14.63, 14.4, 14.1
See application file for complete search history.

(56) References Cited

U.S. PATENT DOCUMENTS

| | | |
|---|---|---|
| 10,140,072 B2 | 11/2018 | Chang et al. |
| 10,387,087 B2 | 8/2019 | Chang et al. |
| 10,489,096 B2 | 11/2019 | Chang et al. |
| 2009/0076912 A1* | 3/2009 | Rajan ................. G06Q 30/0273 705/14.64 |

* cited by examiner

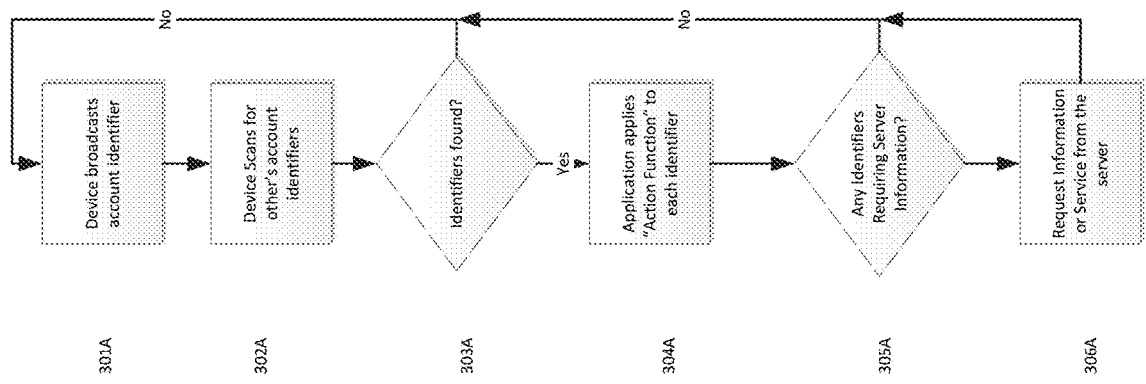

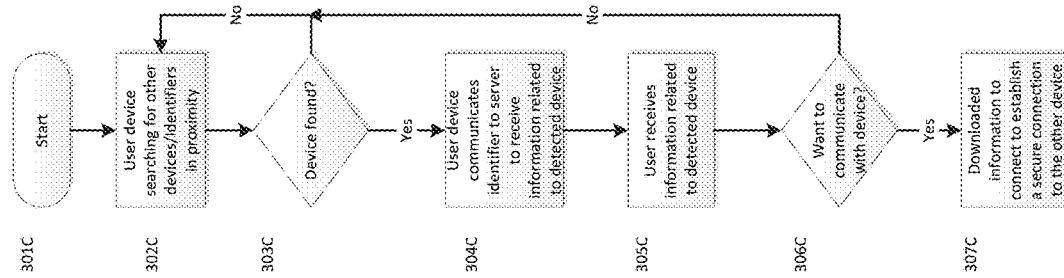
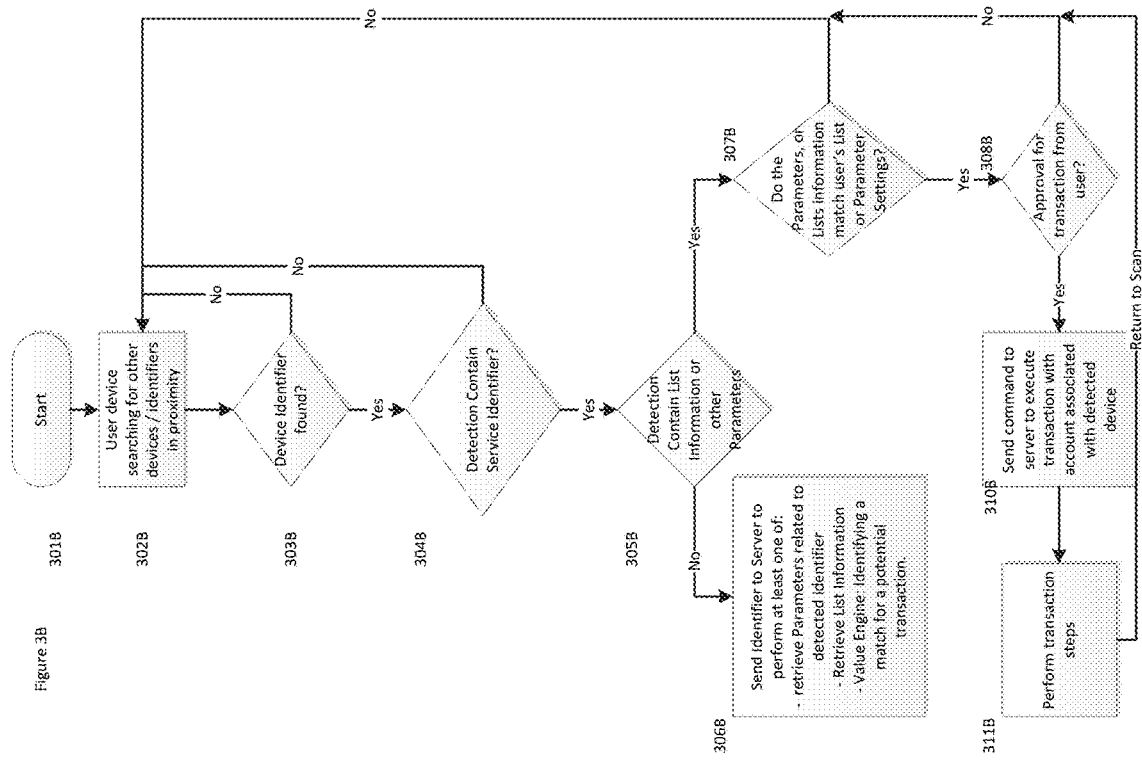

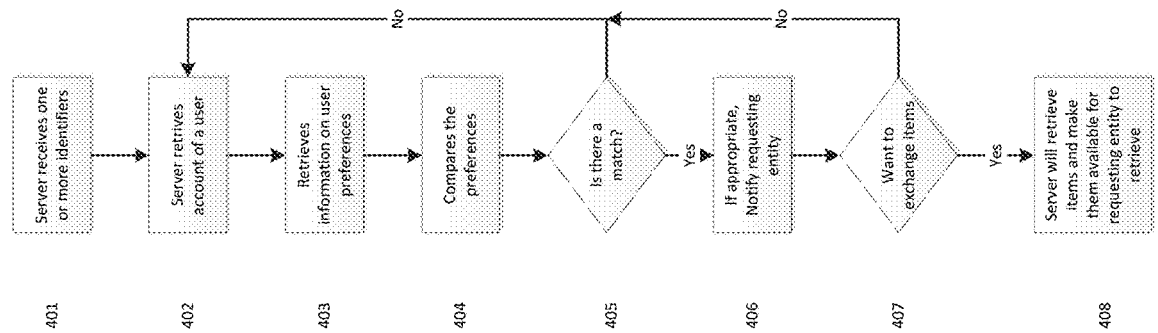

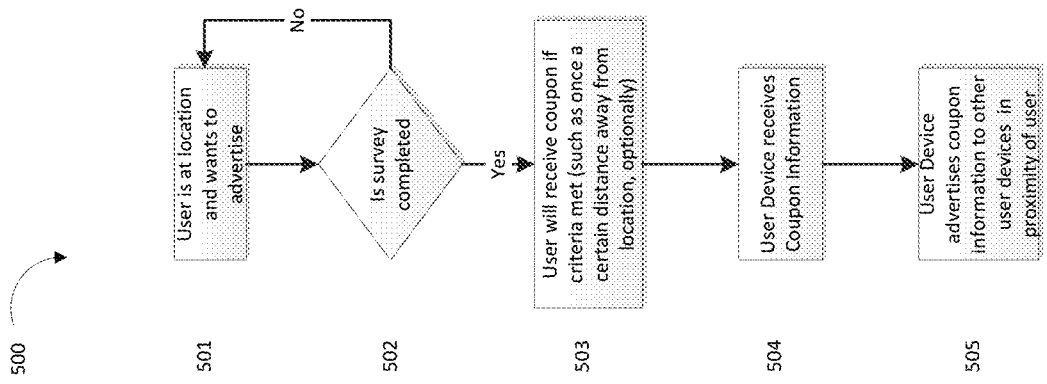

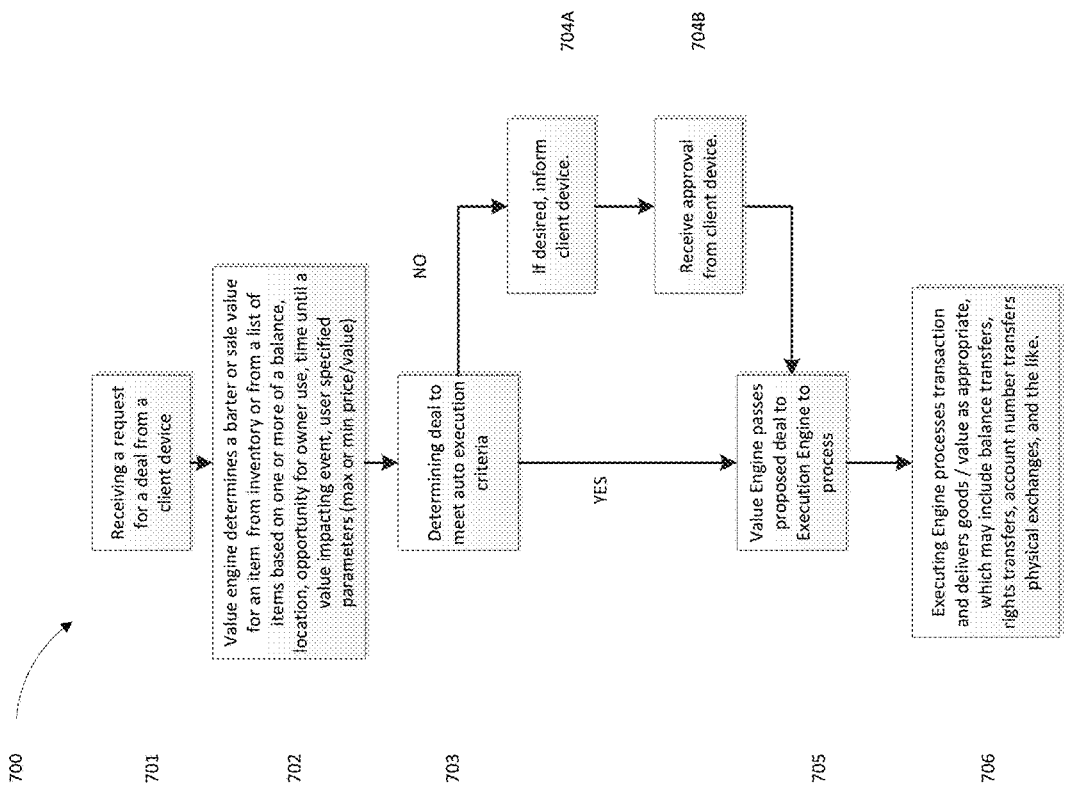

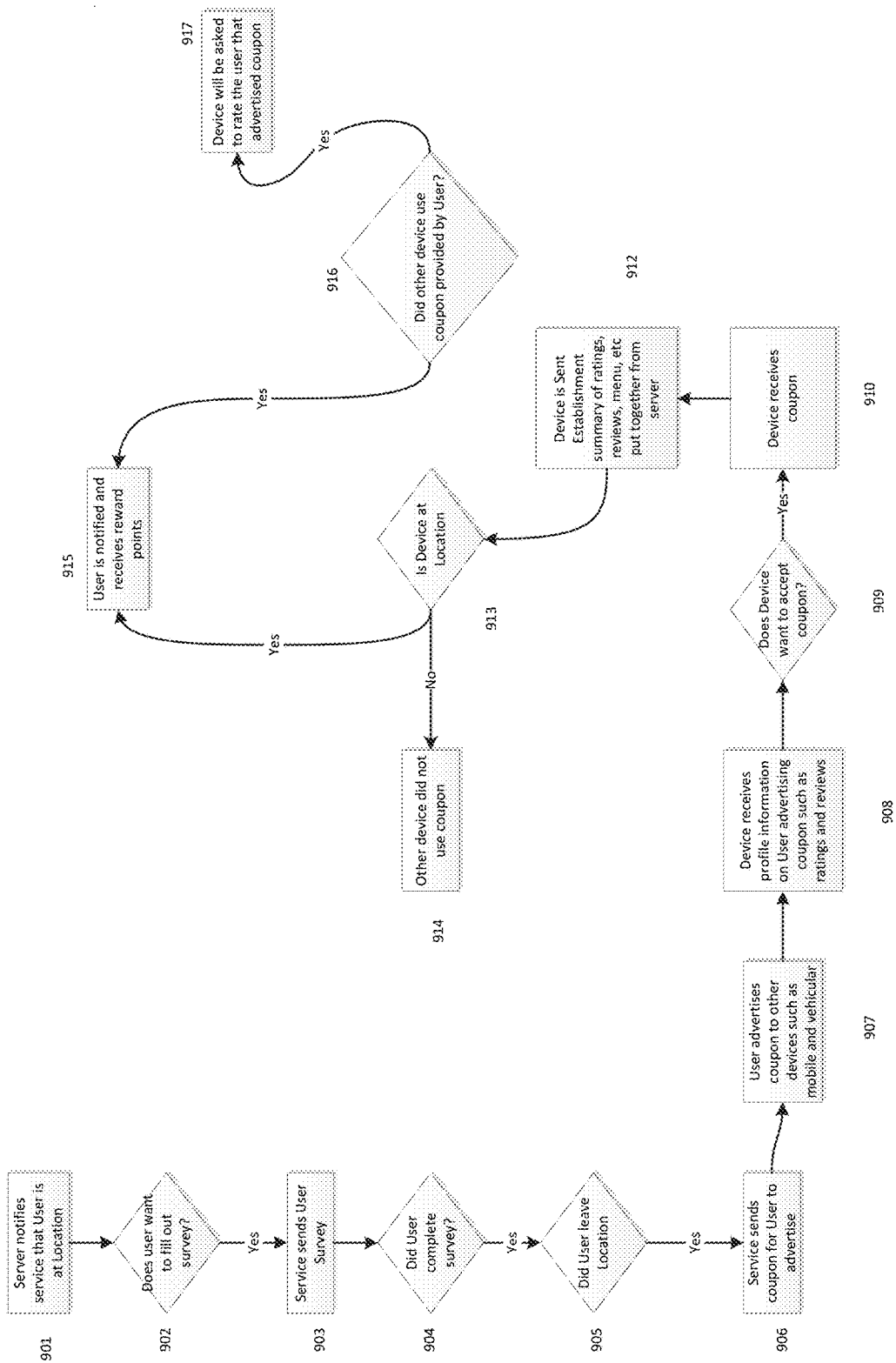

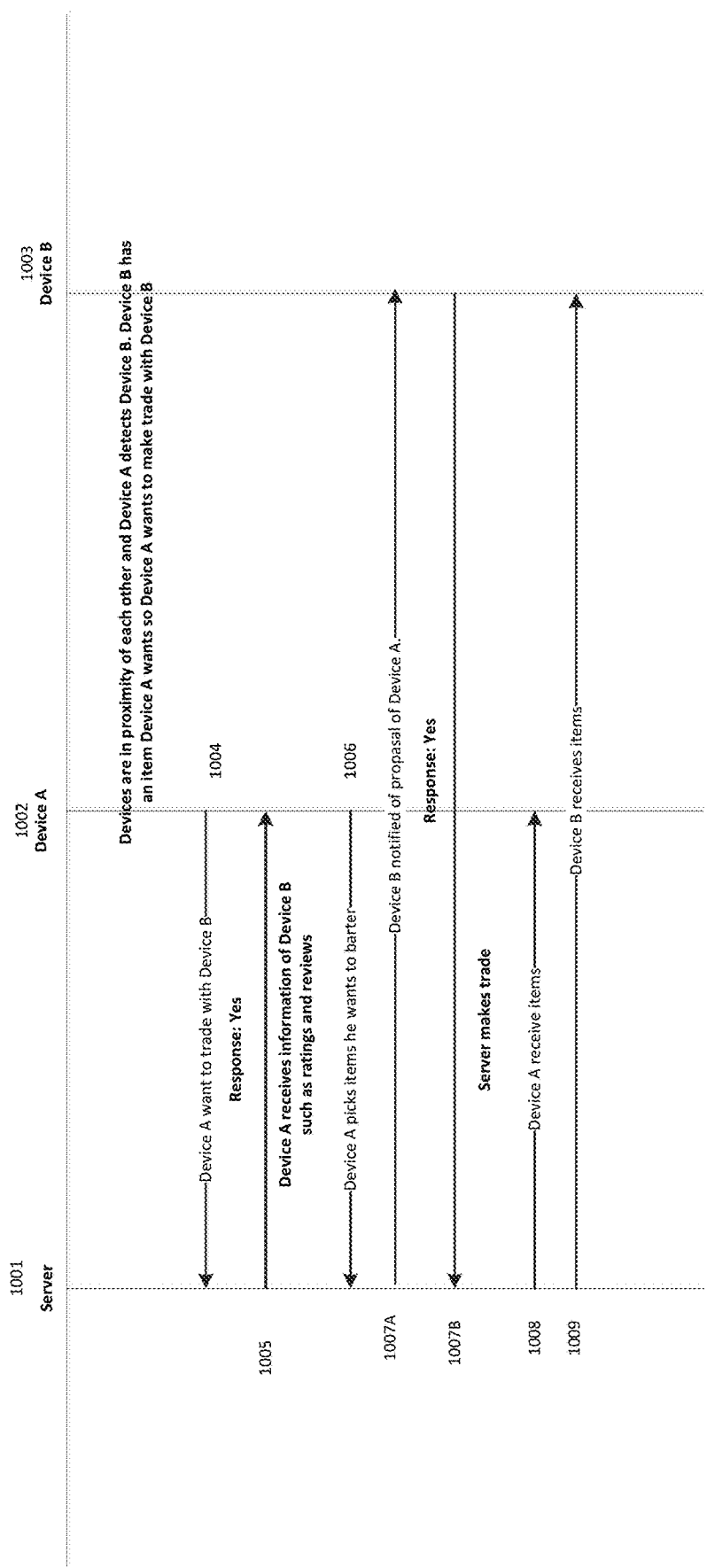

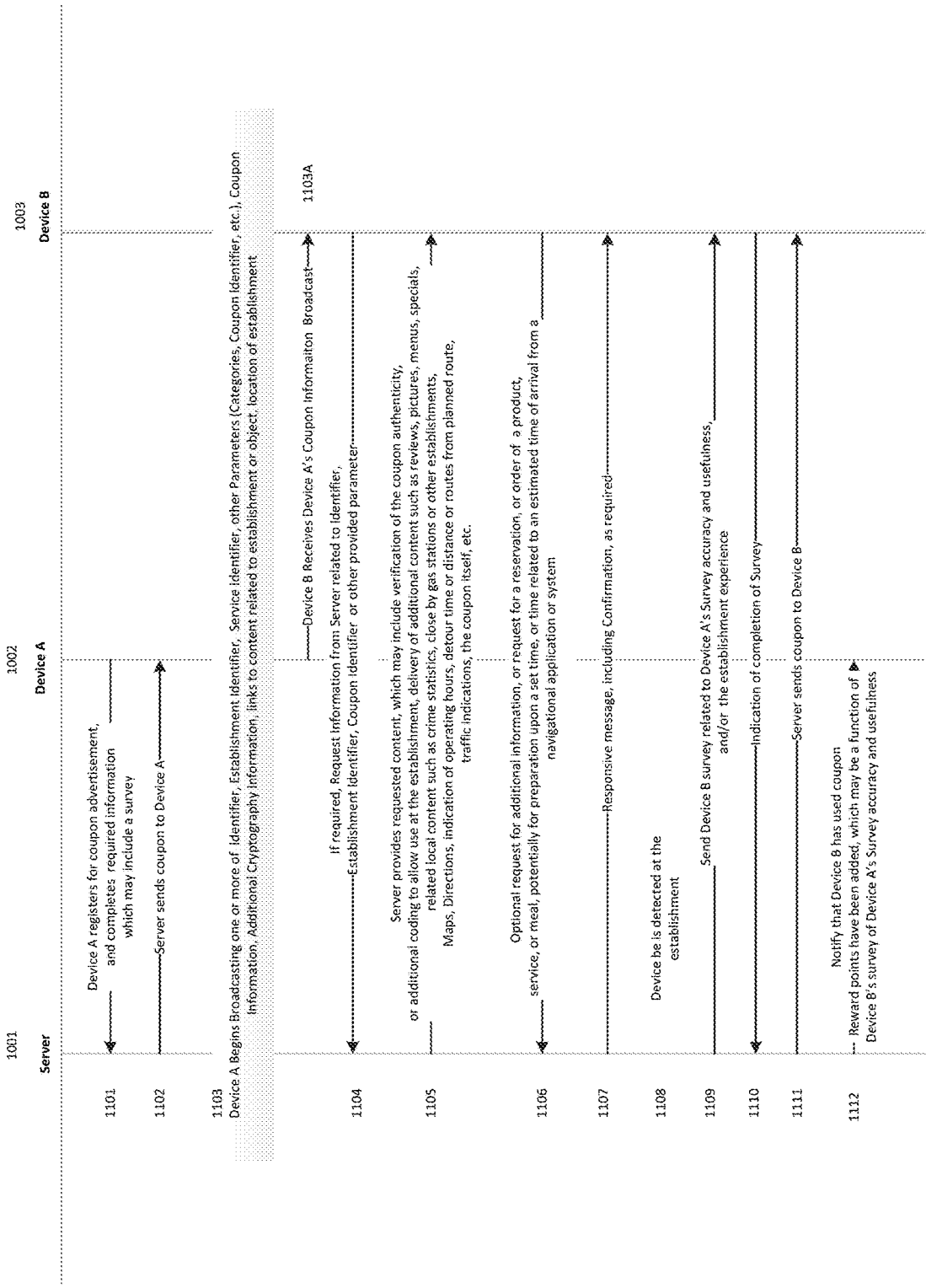

PROXIMITY DETECTION, VIRTUAL DETECTION, OR LOCATION BASED TRIGGERING OF THE EXCHANGE OF VALUE AND INFORMATION

RELATED APPLICATION(S)

This application is a continuation of co-pending application Ser. No. 16/247,669 filed on Jan. 15, 2019; which is a continuation of Ser. No. 15/275,653 filed on Sep. 26, 2016, which is a continuation of application Ser. No. 14/828,742 filed on Aug. 18, 2015, which is a continuation of application Ser. No. 13/449,208 filed on Apr. 17, 2012, which claims the benefit of U.S. Provisional Application No. 61/476,296, filed on Apr. 17, 2011.

The entire teachings of the above applications are incorporated herein by reference.

BACKGROUND

Advances in communication technologies, in particular Internet and wireless communications, lead to an outburst of applications providing a range of electronic services. Such services include electronic commerce, social media, online advertisement, navigation services, location based services, and other services. In addition, with millions of smart phones being sold every year, there is a growing demand for more electronic services facilitating electronic commerce and providing even more location based services.

SUMMARY OF THE INVENTION

In an example embodiment a system, methods, and apparatuses are provided for the valuation and exchange of stored value assets, information of value, and the transfer of value to or among individuals. Such value exchange may include exchange of assets of similar nature, e.g., music files exchanged for other music files, and exchange or trade of information, such as rewards value or a restaurant coupon. The exchanged assets may also be other dissimilar assets exchanged between individuals and/or entities. The exchange may be initiated in numerous ways such as after completing a review, exchanging or trading a gift card, a prepaid card, a reward card, a coupon, a ticket, a pass, and/or the like, when in proximity to a specific location, or a location of some type or category, exchanging or trading assets offered as a result to interaction with smart poster, exchanging or trading assets offered as a result to a payment process or any other process at a point of sale, and/or exchanging or trading other assets between individuals based on one or more constraints such as time, location, need, desire for the assets, and/or proximity.

In another example embodiment, the system, the methods, and the apparatuses allow for individuals with items of value, or information of value to share or transfer those items or information to others in such a way that they will receive value in return. According to an example embodiment verification of the authenticity of an electronic coupon or other voucher of monetary or other value is performed, and traceable and reliable allocation of value to participants in the transaction is executed. As such, the redemption of electronic coupons may be constrained, for example, to time, number of uses, use by a specific entity, and/or the like. Furthermore, tampering with fields or aspects of a voucher, a coupon, a token, a ticket, a pass, a card, and/or the like, may be detected and/or prevented and an asset may be determined to be invalid when tampering is detected.

For example, an individual may use a service associated with an establishment, e.g., dine at a specific restaurant, and his/her wireless device and/or an application thereon may detect that the establishment participates in an electronic review rewards program using location, and/or proximal detection of transmissions. Upon being notified of the electronic review rewards program, the individual may provide valuable information, for example, in the form of an online survey or review. In return, a cryptographically authenticable coupon is made available to the individual's wireless device, or generated by the wireless device in coordination with a server. The server may be accessible, for example, through a wireless wide area network, a wireless local area network, and/or any other communication network. Such coordination may be based on previously downloaded certificates or keys, or may be based on an algorithm such as public private key mechanisms. The coupon may contain text providing details of the coupon, and one or more fields which allow for integrity and/or authenticity verification of the details of the coupon. The one or more fields may also allow traceability to various parties associated with the service, e.g., the electronic review rewards program, including providers of the review, and/or the distributor of the coupons.

There are a number of suitable verification techniques know in the industry, including Cipher Block Chaining Message Authentication Code-Message Authenticity Check (CBC-MAC) used in the Advanced Encryption Standard (AES) algorithm. Additional Public Key Exchange (PKE) approaches may be used in addition to specific Numbers used Once (nonce) values for a given coupon identification details. The coupon may be provided on a web site for download to other users. For example, the coupon may be associated with the location of the restaurant, the name of the restaurant, and/or food categories, and may be provided with relevant search results.

For example, when an individual reads a review of the establishment on their mobile device, the coupon may be downloaded for use at the establishment. Upon use of the coupon, an embedded reviewer identification is passed to the service and a reward is provided to the reviewer for participating in reviewing the establishment and/or the services provided thereby. The Message Authenticity Check (MAC) function prevents tampering with the details of the coupon. For instance, changing the reviewer identification or the amount of the coupon discount or value would invalidate the MAC value and make the coupon not redeemable. Additionally, the details of the merchant, reviewer, supplier of the coupon, the value, may also be embedded in encrypted fields in addition to a MAC value. As such, additional security may be provided to check coupon values, and establishment values. A well know code of this kind in cryptography is the CBC-MAC.

When redeeming a coupon, a user may use Near Field Communication (NFC) tags or a barcode, associated with the coupon, stored on his/her mobile device. Such techniques allow for time dependent rewards, short term time expiration for the coupon or reduction in value, the coupon's use to be tied to the individual downloading it, or gain based on such cryptographic techniques ensures traceability to the receiver's account number. Additionally, rewards may be provided for the redeemer of the coupon, the reviewer, the provider, the establishment, or any combination.

In a case where the Internet is used to provide the coupon, the provider of the coupon may be different than the reviewer, and each may receive a reward for its use. However, other approaches exist for the user's mobile device to receive a coupon. For instance one embodiment, a planned navigational route from a device used during planning of a trip, or transit during a trip, such as with a navigational system in a vehicle or a user's mobile phone's navigational application, may be used to download coupons, or to access virtual coupon broadcasters tied to one or more specific locations. In such a case, virtual location based transmitters of coupon information may be downloaded and include information related to points along a planned route for use later, or during transit, and virtually received based on one or more of a virtual location of the virtual transmitter, actual location of the device performing the detection, a future planned point of the detecting device, searches, enhanced detection settings based upon advertiser's paid for preferred detection criteria, and the like. In such an embodiment, these points may be treated as virtual broadcasters, and treated would be actual transmitters, or as transmitters which may have extended range, or multiple transmission locations are transmission coverage areas or regions. Such coupon information transmitters may be detected when down loaded, or when a search is performed based upon a specific criteria input but the user, or periodically, or based on premium service provided for on a basis of paid for services by an advertiser, or any number of other events or preferences, including the actual location or planned location of the mobile device.

In any such embodiment, and for the purpose of this document, any reference to a detected coupon identifier or information, or other detected identifier may also be construed in another related embodiment as a virtual detection of a virtual transmitter of such information. As such specific embodiments may down load lists of virtual transmitters, which may be tied to actual locations, and detected as would be real transmitters in those locations, in combination with the detection of actual transmission, and treated in a similar manor as the real detections. Such virtual transmitters may be provided by individuals who performed reviews, who have purchased transmitter locations or regions, and have left their virtual transmitters in specific locations or regions to be downloaded, and potentially detected at a later time by mobile devices. The transmitters can be downloaded from a server, over a wide area connection which, in most cases, is expected to be a mobile data link such as LTE, 1xEV-DO, HSPA, GPRS, Wi-Max, etc. The applications performing the downloaded may be running within a mobile device such as a phone, or a automotive entertainment system operating an operating systems such as Android, MeeGo, Brew, iOS, Symbian, Windows Mobile 7, or the like. It is further expected that the application may downloaded from an application store such as the Apple App store or the like.

In the case of a real or even virtual advertisement, in one embodiment, the reviewer's actual device, virtual transmitting device (downloaded inside another's application) or the vehicle may transmit one or more of an identifier of the service, their identifier, the groups and categories to which they have information and/or coupons to share, or the coupons themselves. It is expected that the bulk downloading of virtual transmitters based upon regions to which a device is located or planned to be located, including specific screening parameters, will substantially reduce the transaction load to the wireless network, on the servers operating the service by allowing for a screening of transmitters (virtual or otherwise) prior the exchange or retrieval of information reducing the numbers or transactions for which such messaging must take place. The transmission may be performed by the mobile device, or may be performed by a short range link from a vehicle such as 802.11p/DSRC, 802.11, flashLinq or the like.

The broadcast information may further include references usable to down load portions of the review, coupon, or other information such as location of or directions to the establishment. Thus a coupon may be advertised from one mobile vehicle to another such that, if allowed, a user or occupant of the second vehicle may be notified of categories matching their interests, and coupons or other vouchers that are available. It is contemplated that in some embodiments, an additional cryptographic "signature" and identifier would be added to each transfer of a coupon, and of at any point the coupon were fraudulently modified, it would be invalidated for use. Such progressive signature may be performed using the server's public key, or based on interaction with the server performed a re-issuing of the coupon, or the providing of a new signature field allowing for the use of the coupon by the coupon receiving party, modifying an "allowed user" field, and regenerating a MAC value. The receiving vehicle may be operating a navigation system, with a planned route. In such a case, the receiving "rewards review" system may interface with the navigation system, and based upon downloaded, or the received broadcast information from the advertising vehicle, determine user set preferences, and also determine which broadcast coupon information to notify the user of and which information not to so notify the user of. For instance, if the user setting indicates they do not want Chinese Food, they would not be notified of this available type of coupon. Further, if the coupon information indicated a restaurant location too far from the planned route, or not within a specific time range specified for desired meal, they would not be notified. Additional constraints may be applied such as a safety rating of the neighborhood, time of day, or otherwise based on information downloaded from a mobile data network such as from the Internet for example. Such other information may include of otherwise filter detected coupon information. Additional filter parameters such as a "gas station must be within a specified distance of the establishment" such as 2 miles may be used to further filer the displayed or other results which they occupants are notified therefore.

In another example embodiment, a method for proposing a transaction, or executing a transaction between multiple entities is provided. The method considers the value of the items based upon location, time, an inherent redeemable balance, a discount, and/or the desire or lack of need for those items or information to the person transferring them to another, and to the person or entity receiving those items or information. Exchanged assets may be redeemed using NFC at a point of sale (POS), at smart poster, or from another mobile device.

In another example embodiment, a method for individuals or entities to broadcast or otherwise transfer electronic coupons is provided. The coupons may include a cryptographically encoded value which is used for one or more of: detecting tampering or modification of other values within the coupon, preventing fraud as a result of any modification of fields, determining the authenticity of the coupon, providing traceability of the coupon relative to a providing entity, a participant providing the coupon, content related to the coupon such as a review, the merchant, the receiver or user of the coupon, and the link.

In another example embodiment, traceability of electronic coupons is used to allow for allocation of value to participating individuals, such as a reviewer of a restaurant, who then broadcasts a provided electronic coupon to others from their mobile phone, from a wireless link on their car such as that provided by 802.11p, or DSRC, or directly from a server on the Internet.

According to another example embodiment, an application on a mobile device is provided. The application determines location, or detects short range transmissions with identifiers, or other information which is used to determine relevant services or retailers being close by, or the user being inside an establishment, and providing notification to a user of a device that a service allowing for the receipt of a coupon, voucher, gifs card, or other redeemable items being electronically (or in some cases physically) transferrable to the individual or their mobile device, for redemption at that establishment, the transfer and the redemption preferably be performed electronically using a wireless local area network, or a wireless mobile network for the reception and transfer of the asset, and a near field communication link (NFC) for the redemption of the asset (the voucher, gift card, account balance, coupon, and the like).

According to another example embodiment, a server receives notification from account holders of electronic assets no longer desired, or being offered for sale or trade, and transfers the asset, or the value of the asset to the server, in conjunction with users instruction, and preferences. In some cases user instructions include minimum values to allow for an automatic execution of a trade without further approval by the user providing the item, and/or items that are desired in return. The items in this case may include remaining values on a gift card redeemable at a merchant location. The server may also provide for a valuation engine, which determines matches between sets of individuals which will allow for pre-approved transactions within the set forth instructions from each user, the valuation engine providing for a proposed transaction to a transaction execution engine. The transaction execution engine, in one embodiment, for instance provides for one or more remaining balances on gift cards from one or more individuals to be offered for trade or sale to others using the service. In such an embodiment, an individual device detects their physical approach to a specific retailer (by GPS for instance), or their presence within a retail establishment (by short range wireless detection such as that determined by proximal detection of Wi-Fi beacons, which may include vendor specific information elements with additional details, similar to system describer in the related applications, and by transmission such as is used by the service Shopkick being acoustical in nature). Following the determination that a device is located near or within a specific establishment or type of establishment, the application will may interact with the server over a wireless link to determine if there are any cards available for trade or purchase from the individuals who have previously offered the card as being available, under specific terms and instructions.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3a illustrates an example embodiment of a process performed by an electronic device.

FIG. 3b illustrates another example embodiment of a process performed by an electronic device.

FIG. 3c illustrates yet another example embodiment of a process performed by an electronic device.

FIG. 4 illustrates an example embodiment of a process performed by a server.

FIG. 5 illustrates an example embodiment of a process performed by an electronic device to advertise a coupon associated with an entity.

FIG. 7 illustrates an example embodiment of a value engine process 700.

FIG. 9 illustrates an example embodiment of a process.

FIG. 10 illustrates communication between a server and two electronic devices according to an example embodiment.

FIG. 11 illustrates communication between a server and two electronic devices according to another example embodiment.

DETAILED DESCRIPTION OF THE INVENTION

Figure 1:
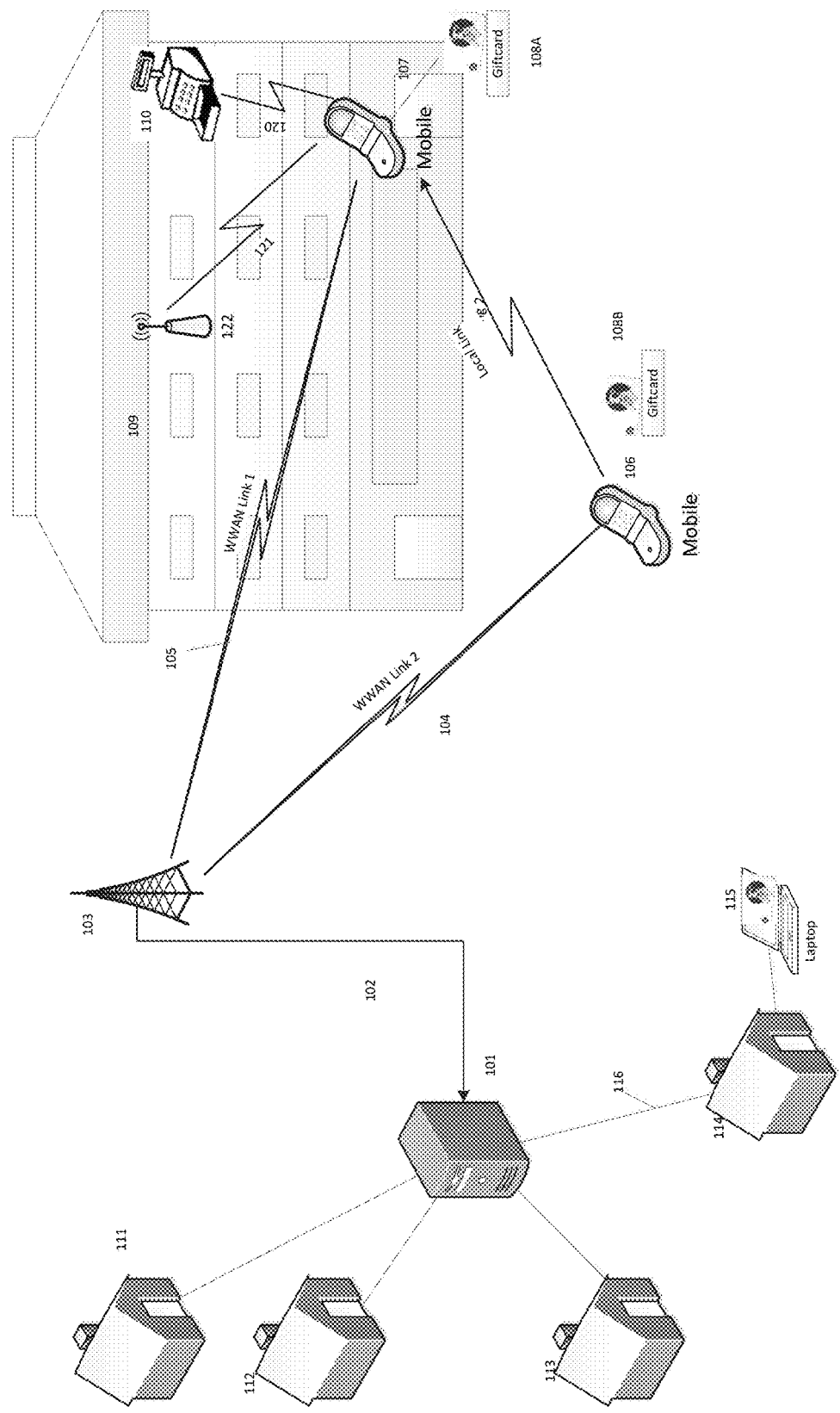
FIG. 1 shows an example system illustrating triggering of a transaction of a stored value asset based on location and/or proximity based events.

A description of example embodiments of the invention follows.

Mobile applications for electronic payments, location based services, and proximity based interaction have largely been employed independently so far. Applicants recognize that combining such services may provide efficient advertisement tools for businesses and individuals having items for sale and enhanced experience for customers or consumers.

Furthermore, existing methods, systems, and/or devices used for electronic shopping and/or bartering may not provide mechanisms for fair evaluation of an item for sale, or exchange, by leveraging factors such as the importance of the item to its seller, time dependent events that may affect the value of the item, a balance associated with the item, the relevance of the item to a potential buyer, and/or one or more conditions associated with a potential buyer. Currently, systems used for electronic interaction may not allow individuals to engage in electronic transactions of items of value, or information of value, where location based or proximity based information is used to identify or determine a potential offer to sell, barter or buy the items or information. Also, information indicative of the relative interest of different entities or individuals in the items and information related to time dependent events affecting the value of the items may not be considered or used by existing systems to set fair values of the items and execute a transaction.

For example, an individual in a specific retail store would benefit from having a gift card for that store prior to checking out at a point of sale (POS) register. The card may be of the most value to that individual while and when he or she is present in the store, and prior to making a purchase or making a payment. One other individual may have a gift card for the same store. The gift card may be associated with a balance and/or an expiration date. The other user may have no interest in using the balance on the card or shopping from the store and/or the gift card may be to expire soon. As such, the other individual is less likely to use the card gift and/or may lose the balance thereon. Given that the gift card is relatively of low value to the other user, most likely he or she is willing to trade it for a reduced price or value. For the individual in the store, the gift card may be of relatively higher value to the individual in the store as he or she may use it to make a purchase or a payment.

In another example, individuals having a previous experience with a retailer, a restaurant, a merchant, or a service have valuable information that is relevant to future users of the service or future customers of the retailer, restaurant or merchant. There is value to future customers or users in knowing that they would have a good experience, quality, value, service or the like when choosing a particular business based on available reviews. There is also value to the retailer, to the restaurant, to the merchant, and/or to the service provider in having the customer advertise his/her good experience to potential future customers or users.

For an individual who owns assets that he/she does not need anymore, the assets may be of low value to that individual. However, for one other individual with interest in, or in need of, the same assets, the assets may be of higher value. For instance, music that is digital rights protected, e.g., using digital rights management (DRM) techniques, may be legally transferred from one individual to another in some circumstances. However, it may not be legal for that individual to receive cash payments for the transfer of that asset, e.g. music. For the individual having music files, for example, that he or she does not need, has no interest in, or simply wants to exchange them for other item(s), it may be difficult to know when and if one other individual, or entity, desires to acquire the same music files, for example, in exchange with other item(s). The music files may be in a format such as WMA, AAC, MP3 or any other format. The individual with the music files may be interested in, or looking for, other item(s) of value to him/her such as other music file(s) or even item(s) of different nature such as a gift card with some associated balance or a discount coupon for use in a store, a restaurant, or any other establishment providing a service. There may be other items owned by even other individuals that are of interest to the individual having the music files and it may be the case where a more complex exchange between multiple individuals is desired.

Some services exist today such a Foursquare, Google Hot Pot, Facebook Places, Shopkick, and the like which provide rewards for "checking in", in a location, while other services provide for mobile e-commerce such as e-bay, PayPal, VISA and amazon.com. Some of these services even include the use of proximity detection to determine when an individual is in a store, and provide redeemable rewards as a result, in the case of Shopkick. Other mentioned services discuss using near field communications on a mobile device to allow for payments or rewards, or redemption of electronic coupons. No existing approaches consider the value of the items based upon location or time or an inherent redeemable balance or discount, or the desire or lack of need for those items by the person transferring them and/or the person or entity receiving them. Furthermore, existing systems may not provide mechanisms or methods to facilitate discovering and matching of an individual or entity offering an item for sale or exchange and an other individual or entity interested in or looking to acquire the same item wherein the discovering and/or matching being based on proximity-based events, location-based events, and/or other triggering events.

FIG. 1 shows an example system illustrating triggering of a transaction of a stored value asset based on location and/or proximity based event(s). A business establishment 109, e.g., a store, a restaurant, a mall and/or the like, includes a broadcast device 122 and/or a point of sale (POS) 110 device. The broadcast device is configured to broadcast, over a communication link 121, information related to at least one of: discounts in one or more products, coupons for use in the business establishment, gift cards, identification numbers associated with an entity associated with the business establishment 109, e.g. a store or a restaurant, advertisements, website links, and/or the like. The broadcast device 122 may be a smart poster, an audio broadcasting device, a Bluetooth™ broadcaster, a Wi-Fi broadcaster, and or the like. Accordingly, the communication link 121 may comprise one or more of: a near field communication (NFC) link, a Wi-Fi link, a Bluetooth™ communication link, and/or the like. The point of sale 110 may be configured to communicate, for example, with mobile devices using the communication link 120. The communication link 120 comprises one or more of: a NFC link, a Wi-Fi link, a Bluetooth™ communication link, and/or the like. A mobile device 107 located inside or in the vicinity of the business establishment 109 may receive communication messages from the broadcast device 122 and/or the point of sale 110 through communication links 121 and 120, respectively. The mobile device may also receive communication messages from another close by mobile device 106 through a local area communication link such as Wi-Fi, a Bluetooth™ communication link, and/or the like. The mobile device 107 may also communicate messages to one or more of the devices 122, 110, and/or 106. At least one of the mobile devices 107 and 106 is coupled to a server 101 through the Internet, for example. Internet access may be achieved, for example, through a wireless wide area network (WWAN) link, 104 and/or 105, and/or a wireless local area network (WLAN) link. The server is also be coupled, for example through the Internet 116, to one or more other client devices such as client device 115 located in building 114, and/or any other remote devices associated with buildings 111, 112, and/or 113.

According to an example embodiment of FIG. 1, a transaction of a stored value asset, e.g., a gift card, a prepaid card, a reward card, a coupon, an asset associated with a game, a digital asset, and or the like, usable at the establishment 109 is triggered based on location and/or proximity based events. For example, the presence of mobile device 107 inside, or in the vicinity of, the establishment 109 is detected by one or more of the devices 110, 122, 106, and 101 using Global Positioning System (GPS) information, location information communicated by the mobile device 107, detection of communication signals transmitted from the mobile device 107, and/or any other event indicative of the presence of the mobile device 107 at or near the establishment 109. Alternatively, the mobile device 107 detects transmission from one or more of the devices 106, 110, 122, and 101. The user of the mobile 107 receives a notification from one or more of the devices 106, 110, 122, and 101, on his/her mobile device of an offer to purchase, and/or barter a stored value asset. The notification may be, for example, included in an advertisement message, sent in a response to a request by the mobile device 107, and/or sent in response to detecting the location of the mobile device 107 or its proximity to any of the devices 106, 110, and 122.

The stored value asset may be offered at a discount relative to a balance and/or value associated with the stored value asset.

According to an example embodiment, a user of the client device 115 has a first stored value asset, e.g., a gift card, a prepaid card, a reward card, a coupon, a digital asset, and/or any other asset, that he/she puts for auction through the server 101. Upon detecting the presence of the mobile device 107 inside, or in the vicinity, of the establishment 109, the server 101 offers the first stored value asset to the user of the mobile device 107 for purchase and/or barter. The user of the mobile device 106 has another stored value asset that may be of interest to the user of the mobile device 107. The mobile device 106 may send a notification to mobile device 107 with regard to the other stored value asset being for sale and/or barter. Alternatively, the server 101 detects that both mobile devices 106 and 107 are in proximity and offers the other stored value asset to the user of mobile device 107 for purchase and/or barter. According to another example, device(s) 122 and/or 110 may have a stored value asset which may be offered to the user of the mobile device 107 for purchase and/or barter directly by the device(s) 122 and or 110 or by the server upon detecting that the mobile device 107, or its user, being in proximity to the device(s) 122 and/or 110.

The server may detect the location of a mobile device and/or its proximity to one or more other devices in different ways. For example, the server receives a message from mobile device 107 with information indicative of its location, e.g., GPS information, a Media Access Control (MAC) address associated, for example, with a local area network, and/or the like. Alternatively, the server receives a message from the mobile device 107 indicative of one or more identifiers associated with one or more of the devices 106, 110, and 122, and/or with corresponding entity/entities. According to another example, the server receives a message from one or more of the devices 106, 110, and 122 indicative of an identification associated with the mobile device 107 and/or its user. For example, as the user of mobile device 107 is making a payment at the point of sale 110, a payment authorization request is sent to an entity managing an account of the user of mobile device 107. The server 101 receives a notification of such request and determines that the mobile device 107 is, for example, located in the establishment 109 and/or in proximity to the point of sale 110. Having access to information related to the location of device 122 and/or 106, the server may further determine that device(s) 122 and/or 106 are in proximity with mobile device 107.

Upon the mobile device 107 accepting an offer to purchase and/or barter a stored value asset, or the server selecting a stored value asset on behalf of the user of mobile device 107, a transaction is executed. In executing the transaction, stored value assets of similar or different nature are exchanged between different entities. Alternatively, a stored value asset is purchased in according a price valued with real and/or virtual currency. The server 101 may execute the transaction upon receiving approval from the mobile device 107 and/or other entity involved in the transaction. Alternatively the server 101 may execute the transaction automatically based on one or more criteria.

Figure 2:
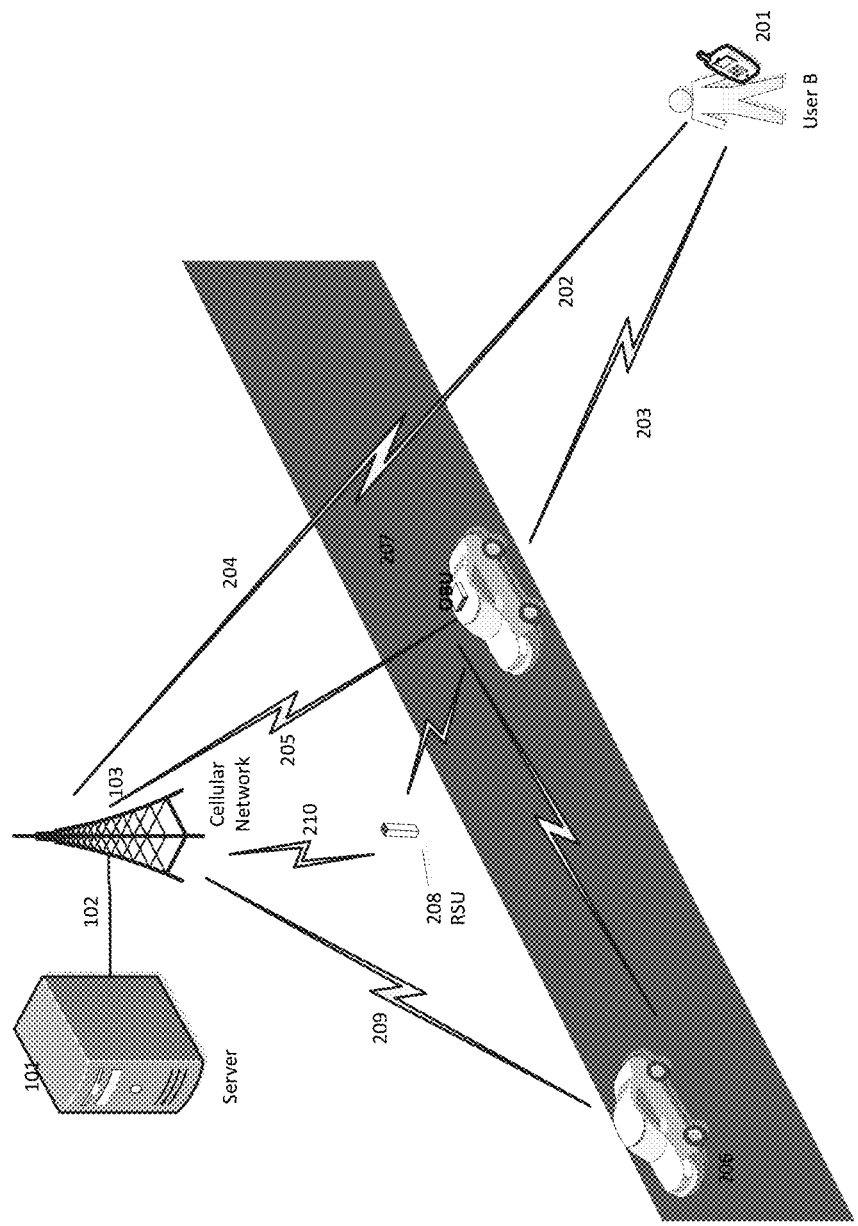
FIG. 2 shows another example system illustrating triggering of a transaction of a stored value asset based on location and/or proximity based events.

FIG. 2 shows another example system illustrating triggering of a transaction of a stored value asset based on location and/or proximity based event(s). According to the example embodiment of FIG. 2, two or more devices drive by or otherwise pass by each other. For example, the devices may be vehicle devices, mobile devices, e.g., mobile phone and/or smart phone, and/or a combination thereof. The devices, for example, include at least one de dedicated-short range connection (DSRC) on board unit (OBU) and/or at least one DSRC road side unit (RSU). In the example of FIG. 2, a vehicle 207 with an OBU drives by a RSU 208 and mobile device 201 associated with a user B. The vehicle 207 is in proximity with another vehicle 206. The OBU in vehicle 207, for example, detects the mobile device 201, the RSU 208, and/or a communication device associated with vehicle 206 using proximal wireless link(s) 203. The proximal wireless link 203 comprises one or more of a DSRC link, a Wave link, an 802.11p link, an 802.11x link, a Bluetooth™ link, a NFC link, a FlashLinq communication link, and/or the like. Alternatively the OBU in vehicle 207 is detected by one or more of the RSU 208, the mobile device 201, and/or the communication device associated with vehicle 206 using the proximal wireless link(s) 203. It is also to be noted that device detection may also occur between any of two devices of the RSU 208, the mobile device 201, and the communication device associated with vehicle 206. A first device detects a second device by receiving an identification associated with the second device over the proximal wireless link 203. For example, the communication protocol, e.g., DSRC, Wave, 802.11p, an 802.11x, Bluetooth™, NFC, FlashLinq, and/or the like, used for communication over the proximal wireless link transfers the identifier from one device to another.

According to an example embodiment, detection of a device by another device involves only detection of the identifier associated with the detected device. The identifier may be a device identifier, an account identifier identifying an account of an entity associated with the detected device, a service identifier associated with a service that is registered to and/or advertised by the detected device. The identifier may also be a MAC address where the identifier is an application level device or user unique identifier such as an account identifier or account alias, or a temporary identifier known to the server 101, 201. For example, the detected device advertises a service or application availability indicative of the device capability to engage in a bartering or electronic commerce process. Following the detection subsequent peer-to-peer communications may be established to transfer subsequent information.

According to an example embodiment of FIG. 2, at least one of the RSU 208, the OBU in the vehicle 207, the communication device associated with the vehicle 206, and the mobile device 201 additionally has a second wireless connection, e.g., 204, 205, 209, and/or 210. The second wireless connection may be WWAN connection and/or a WLAN connection. The detecting device and/or the detected device communicated with at least one trusted server 101 using an Internet connection 102. For example, the RSU 208, the mobile device 201, the OBU in the vehicle 207, and/or the communication device associated with the vehicle 206 establish an Internet connection with the at least one trusted server 101 using at least in part the Cellular network 103, or alternatively a wireless local area network. The communication between an electronic device, e.g., the RSU 208, the mobile device 201, the OBU in the vehicle 207, and/or the communication device associated with the vehicle 206, and a server 101 may be secure, e.g., encrypted. The Internet connection may be direct, e.g., using a wired or wireless connection, indirect, e.g., using a peer-to-peer protocol such as Wi-Fi, through another device's Internet connection, through Bluetooth™, and/or the like.

According to an example embodiment, two or more of the electronic device, e.g., the RSU 208, the mobile device 201, the OBU in the vehicle 207, and/or the communication device associated with the vehicle 206, exchange information related to a potential offer or transaction of a stored value asset over the proximal wireless link 203. The exchange of information may be between vehicles, e.g., 206 and 207, between the RSU 208 and at least one vehicle, e.g., 206 and/or 207, and/or between a pedestrian, e.g., user B of the mobile device 201, and at least one vehicle, e.g., 206 and/or 207. For example one or more of the electronic devices may advertise a stored value asset, e.g., a coupon, a gift card, a prepaid card, a reward card, a digital asset, and/or the like, for sale and/or bartering. Alternatively, one or more of the electronic devices may broadcast an identifier. The identifier may be an identifier of the device performing the broadcast, an identifier of an account associated with a user of the electronic device, a service identification, and/or the like. An electronic device receiving information advertised and/or broadcast by another electronic device over the proximal wireless link 203 may use an Internet connection, e.g., over another wireless link, to communicate with the server 201. Electronic devices may, alternatively, communicate with the server 201 using short message service (SMS), multimedia messaging service (MMS), and/or the like. In communicating with the server 210, an electronic device may request further information related to the advertised and/or broadcast information, request the server to broker and/or execute a potential transaction with an entity associated with the advertising, and/or broadcasting, device.

FIG. 3a is a block diagram illustrating an example process performed by an electronic device, e.g., the mobile device 106, 107 and/or 201, the OBU associated with vehicle 207, and/or the like. At 301A, an identifier, e.g., an account identifier, a device identifier, a service identifier and/or the like, is broadcast and/or advertised. At block 302A, a scan and/or a search for other identifier(s) is performed, wherein the other identifier(s) being associated with, for example, other electronic device(s), establishment(s), entity/entities associated with other electronic device(s), service(s), other account(s), and/or the like. The electronic device performing the process in FIG. 3a may perform both the broadcasting of an identifier and the scanning, and/or searching, for other identifier(s). Alternatively, either the broadcasting of an identifier or the scanning, and/or searching, for other identifier(s) is optional.

In the case where no other identifier is detected at 303A, the broadcasting of an identifier at 301A and/or the scanning for other identifier(s) may be repeated. If other identifier(s) are detected at 303A, an action function is employed at 304A. The action function would act as a filter that determines which of the detected identifiers to be passed to a server, e.g., 101 or 201. The action function may instead be omitted and all detected identifiers are passed to the server 101, 201. The effect of the action function comprises reducing the number of requests to the server, e.g., 101, 201, by not re-requesting recently requested identifier(s) information.

At block 305A, the electronic device performing the process in FIG. 3a determines whether request(s) related to any other identifier(s) are to be sent to the server, e.g., 101, 201. If no requests are to be made, the electronic device may either continue to search, or search at a later time for other identifier(s). If the action function at 304A does not filter all detected identifiers, at block 306A the electronic device uses, for example, a WWAN and/or a WLAN connection to communicate with the server 101, 201. A WWAN connection includes, for example, a CDMA-2000 link, a WCDMA link, a TDS-CDMA link, a LTE link, a Wi-Max/802.16 link, a wide area cellular protocol, and/or the like. The electronic device, for example sends the detected identifier(s) to the server 101, 201. The server, e.g., 101, 201, may respond with information related to the identifier(s) it received. Alternatively, the server, e.g., 101, 201, may respond with a deal to purchase and/or barter a stored value asset. In another example, the server, e.g., 101, 201, queries a database storing an inventory of stored value assets using the received identifier(s) and selects one or more stored value assets. The server may further receive information related to a desired transaction value. The server responds by sending a redemption identifier message to the electronic device. The redemption message, for example, includes redemption identifier(s) usable by the electronic device to redeem the value associated with the selected one or more stored value assets.

According to an example embodiment, a service is advertised by an electronic device, e.g., mobile device 106, 107, and/or 201, broadcast device 122, point of sale 110, RSU 208, OBU in vehicle 207, the communication device associated with vehicle 206, and/or the like. An advertised service includes, for example, a card and/or coupon exchange service, a barter service, an electronic commerce service, and/or the like. In advertising a service, the electronic device may advertise an identifier identifying the service and/or identifier(s) associated with an application indicative of the electronic device capability to engage in corresponding service(s) such as bartering, electronic commence, and/or the like.

For example, a service may be advertised numerically as a service registered to with a service identifier. The service identifier, for example, is indicative of an application level service registered with a known service or application registration authority, either public or private entity. An example of such identifier is a Google Application ID. Alternatively, service advertisement is performed based upon one or more of a service set identification (SSID) name, a Bluetooth™ device name, a Bluetooth™ device service, Wi-Fi identification, e.g., a MAC address, an action frame with a vendor specific identifier (ID), a service or application availability identifier as available using an NFC connection, a beacon information element with a unique vendor specific information element identifier, and/or the like.

A beacon information element may include one or more identifications of the service such as an identifier for the individual or entity associated with that service or device, a list of preferences, items available and items desired, an electronic coupon or advertisement, and/or the like. The vendor specific information may be embedded in information transmitted from various devices such as those using 802.11 and may be embedded in beacon transmitted information. The vendor specific information may also be included in Bluetooth™ advertisements, for example, found within a Bluetooth name response packet or listed in services lists as provided in a LMP_features_req message or LMP_features_req ext message for a Bluetooth™ device. The vendor specific information may include, for example, a list of available coupons and/or cards, links to coupons and/or cards, attributes to coupons and/or cards such as a category a coupon and/or a card pertains to retail, restaurant, or others the coupons themselves, the cards, and/or the like.

Following the detection of identifier(s), subsequent peer-to-peer communication(s) may be performed between two or more electronic devices to exchange subsequent information. For example similar approaches as described with respect to service advertisement above are used in the transfer of subsequent information. The subsequent information comprises shared list(s) which include list(s) of stored value assets desired for acquisition by a user associated with an electronic device. The shared list(s) may also, or alternatively, include list(s) of stored value assets authorized for bartering or trade in exchange for other desired items. The shared list(s) may also, or alternatively, include list(s) of desired services, and/or available services such as Internet connection, printer services, or streaming content services such as audio and/or video streaming. The shared list(s) may also indicate a maximum and minimum monetary value associated with one or more of the desired and/or available assets on the list(s). The monetary value may be, for example, in units of a "virtual currency" such as Facebook credits, rewards points, Zynga zPoints or ZCoins, Kickbucks from Shopkick. The monetary value may also be defined in terms of an actual currency such as United States Dollar (USD).

According to an example embodiment, the shared lists are transferred between two electronic devices using a local wireless connection. Alternatively, the shared lists are at least partially retrieved from the trusted server 101 utilizing a device or account identifier of the detected device received during a detection process. Device identifiers may also be used to determine if an associated device is capable of performing or supporting an application or services related to advertised information. The server 101 compares the shared lists associated with the requesting electronic device and the detected device, for example, by comparing desired assets of one device to available assets for barter/trade list of another device. The server 101 may also compare location of one or both devices with, for example, service advertisement location. The server 101 may, for example, only show the assets and or items both devices have in common.

FIG. 3b is a block diagram illustrating another example process performed by an electronic device, e.g., the mobile device 106, 107 and/or 201, the OBU associated with vehicle 207, and/or the like. The process may be implemented as an application, e.g., a mobile application, or as a part of an application. Upon starting the application, e.g., at block 301B, a scan and/or a search for other identifier(s) and/or other device(s) in proximity is performed at 302B. If no other identifier is detected at 303B, the electronic device may continue scanning and/or searching for other identifier(s) or may perform another scan and/or search at a later time. If one or more identifiers are detected at 303B, the electronic device determines, at 304B, whether the detected one or more identifiers include a service identifier. If no service identifier is detected at 304B, the electronic may repeat another scan and/or search for other identifier(s) immediately or at a later time. However, if a service identifier is detected at 304B, the electronic device determines, at 305B, whether other information, e.g., parameter(s) and/ or a list of stored value assets, are advertised with the service identifier. If no other information is advertised with service identifier, the electronic device sends, at block 306B, one or more of the detected identifiers to the server 101.

At block 306B, the server 101 retrieves parameter(s) associated with the one or more received identifiers from a database and/or determines a list of stored value assets to be traded between an entity associated with the received one or more identifiers and an entity associated with the electronic device that sent the one or more identifiers to the server. A value engine, at the server 101, may determine a deal that is consistent with criteria, for example, associated with one or more of the entities involved in a potential transaction.

At block 305B, if parameters and/or a list of stored value assets are advertised with the service identifier, the electronic device determines at block 307B whether the advertised parameters match the settings associated with electronic device or the corresponding entity. The client device may further, or alternatively, determine whether there is a match between the advertised list and the list of stored value assets associated with the electronic device or its corresponding entity. If no match is found, the electronic device may scan again and/or search, immediately or at a later time, for other identifier(s). However if a match is found, the user of the electronic device is asked to approve purchase and/or bartering of matched asset(s) at block 308B. If no approval received from user, the electronic device may scan again and/or search, immediately or at a later time, for other identifier(s). If the user approves the purchase and/or the bartering at 308B, a command and or a request is sent to the server 101 to execute the transaction with the account associated with the detected electronic device at block 309B. The server 101 executes the transaction at block 310B. The server, for example, sends a redemption identifier to the electronic device to redeem the stored value asset. Alternatively, the server 101 retrieves the stored values assets to be exchanged or their corresponding links and sends them to at least one of the electronic devices involved in the transaction. The server may also transfer the purchased stored value assets to an account associated with the purchasing entity.

FIG. 3c is a block diagram illustrating yet another example embodiment of a process performed by an electronic device. The actions associated with blocks 301C, 302C, and 303C are similar to those associated with block 301B, 302B, and 303B of FIG. 3b. If an identifier is detected at 303C, the electronic device communicates, at block 304C, the detected identifier to the server, e.g., 101. Upon receiving the detected identifier, the server, e.g., 101 responds back, at block 305C, with information related to the detected identifier, the corresponding device, and/or the entity associated with the corresponding device. Upon checking the received information, the user of the electronic device decides, at block 306C, whether to communicate with the detected device or the entity associated thereof. For example, the user of the electronic device may decide based on whether the received information indicates any stored value assets of interest to the user, whether indicated stored value assets of interest to the user are associated with reasonable or low bartering and/or trading value(s), whether the entity associated with the detected device has good rating(s), and/or the like. If the user of the electronic device decides, at 306C, not to communicate with the detected device, the electronic device continues to search for other devices and/or identifiers at 302C. If the user of the electronic device decides, at 306C, to communicate with the detected device at 306C, the electronic device downloads at 307C information used to establish a secure connection with the other device. The connection may be a peer-to-peer connection, a wireless personal area network (WPAN) connection, a WLAN connection, a Bluetooth™ connection, and/or the like. The electronic device may send an invitation to the detected device to join a secure connection either after downloading the information or even without downloading any information.

FIG. 4 is a block diagram illustrating an example embodiment of a process performed by a server 101. At block 402, the server 101 receives one or more identifiers from an electronic device. At 402 the server 101 retrieves account(s) associated with received one or more identifiers. For example, the server 101 may retrieve an account associated with a first electronic device that sent the one or more identifiers and/or a corresponding entity and an account associated with a second electronic device and/or entity detected by the first electronic device. The server then retrieves, at block 403, information related to user preferences, and/or list(s) of available assets, associated with first and second electronic devices. At block 404, the server 101 compares retrieved information associated with both devices. If a match is found at block 405, for example, between desired assets associated with one electronic device, and/or the corresponding entity, and available assets associated with the other electronic device, and/or the corresponding entity, the server notifies one of, or both, electronic devices, and/or corresponding entities, at block 406. For example, once information related to desired list(s) of assets and/or information related to list(s) of available assets are collected a notification is sent to one of the, or both, devices including a new compiled list of matched assets. If no match is found at block 405, the server may check other accounts associated with one of the two electronic devices if available.

At block 407, one of the, or both, devices is/are requested to indicate, for example, whether the transaction is to be automatically approved, manually approved, or per asset approved. Whether or not an approval is desired depends, for example, on the rating of each user. For example, if a user has low rating(s), the server 101 usually asks if other device wants to pair, and/or perform a transaction with the user having low rating(s). A transaction may be approved automatically, e.g., by server 101, or through a request and response communication with one of the, or both, electronic devices and/or corresponding entities. If a transaction is approved, the server retrieves the assets to be exchanged and make them available, at block 408, to respective device(s) and/or corresponding entities. For example, the server 101 may send assets or corresponding links to respective device(s). Alternatively, the server 101 transfers assets or corresponding links to respective account(s) associated with respective device(s) and/or corresponding entity/entities. In yet another example, the server 101 sends a redemption identifier used to redeem the stored value asset to a respective device and/or transfers the redemption identifier to a respective account. A redemption identifier includes an identifier of the asset such as a barcode or a number, a link, a digital image of the asset, and/or the like.

According to an example embodiment, the server may broker the transaction by either overseeing the transaction being made or storing media files or other files onto the server so as to ease the retrieval of assets by users at a later time. Data that can be exchanged in a transaction of stored value assets include gift cards, prepaid cards, reward cards, coupons, rights to a video or movie and/or the actual movie file, rights to an audio file, e.g., musing file, or the actual audio file, items such as artifacts, virtual coins, and/or assets associated with a game, and/or the like.

The server 101 may also be triggered by an event, e.g., a payment by an entity associated with an electronic device at a point of sale, an interaction between an electronic device and a smart poster, and/or the like, to send a message to one or more devices with notification of being in proximity with other devices or an establishment. The server 101 may alternatively keep track of locations of mobile devices, for example, through a client application that runs on mobile devices and sends location information to the server periodically. The server 101 also notifies electronic devices of asset matching, with other devices and/or entities. For example, the server 101 notifies an electronic device of another device in proximity and instantaneously pairs with other device in proximity to barter or exchange stored value assets. The server may also keep track of location devices such as RSUs 208, Broadcast devices 122, point of sale devices 110, and or the like.

FIG. 5 is a block diagram illustrating an example embodiment of a process 500 performed by an electronic device to advertise a coupon associated with an entity. The entity may be an establishment 109, such as restaurant, a store, a service provider, and/or the like. The entity may also, or alternatively, be a website, such as www.amazon.com, www.overstock.com, and/or the like, and as such the coupon may be accessed through the website, online search, and/or any other electronic data transfer means. At block 501, a user associated with an electronic device is at a location, e.g. establishment 109 such as a restaurant, a store, and/or the like, and is willing to fill a survey associated with establishment. Once it is determined at block 502 that the survey is completed, the user receives a coupon associated with the establishment, for example, on his electronic device at block 504. Receiving the coupon may also be conditioned by other criteria such as the user, and/or corresponding electronic device, being a certain distance away from the location and/or establishment, a certain amount of time after completing survey, and/or the like that are checked at block 503. Upon receiving the coupon, the user advertises the coupon at block 505, for example, through his electronic device to other devices in proximity. The coupon may be stored in the server or in a database. The coupon may also be accessible through a website, an online search, through a smart poster, and/or any other electronic means.

An in-store point of sale, for example, advertises coupon(s) for rewards points. A first electronic device receiving the coupon sends details of the coupon directly to a second device, and/or corresponding user using a local wireless communication link, an Internet connection, NFC, an email service, SMS, MMS, and/or the like. The user of the first electronic device may or may not complete a survey associated with the store related to the point of sale. The server 101 may put together a summary, for example, of rating(s), reviews, menu, calculation average rating, and/or the like for users to review. Once the user of the second device utilizes the coupon, a notification is sent to the user of the first electronic device to notify him/her of additional points acquired in return of advertising the coupon. As stated above, the user of the first electronic device may have to wait a certain preset period or be a certain distance away from the point of sale, and/or associated establishment, before initiating coupon advertisement. Information such as GPS coordinates of the first electronic device may be used to establish location of the first electronic device and therefore enable and/or disable coupon advertisement. In case a review or survey is to be completed, acceptance of such review may be time sensitive. For example the reviews of locations would have to be completed within a certain time of leaving the location.

Figure 6B:
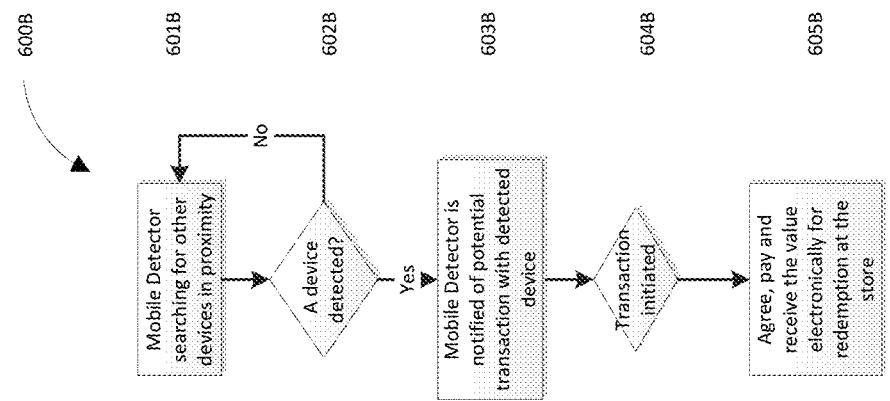
FIG. 6b illustrates an example embodiment of a process 600B performed by an electronic device associated with a desired stored value asset to be purchased or acquired in exchange with another asset.
Figure 6A:
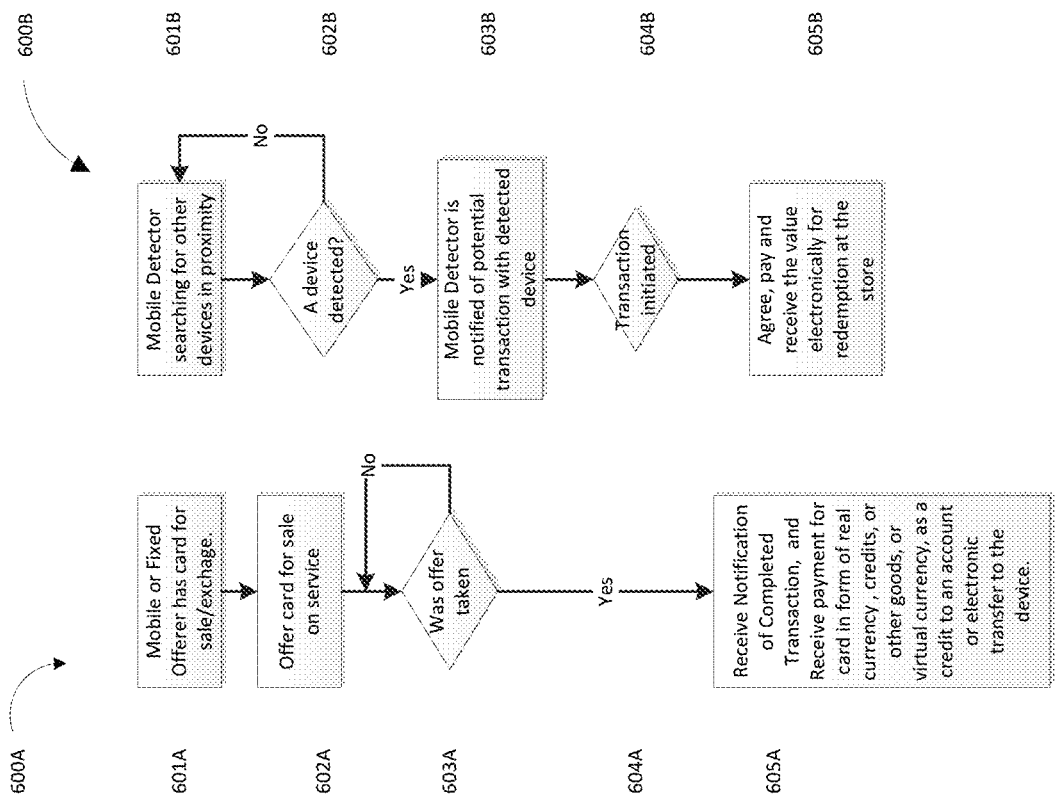
FIG. 6a illustrates an example embodiment of a process 600A performed by an electronic device associated with a stored value asset for sale and/or bartering.

FIG. 6a is a block diagram illustrating an example embodiment of a process 600A performed by an electronic device associated with a stored value asset for sale and/or bartering. At block 601A, the electronic device determines an asset, e.g., a card, to sell and/or exchange with another desired asset. At block 602A, the electronic device offers the asset for sale and/or exchange on a service. The service may be, for example, a card exchange service, a bartering service, an electronic commerce service, and/or the like. The electronic device may offer the asset by means of advertisement to other devices in proximity and/or through a server 101 associated with the service. If the offer is not taken at block 603 A, the electronic device may continue advertising the asset. Once the offer is taken at 604A, for example by another entity, the electronic device receives notification of completed transaction at block 605A and receives payment for asset. The payment may be in the form of real currency, virtual currency, credits, other assets, and/or the like. The payment may be by means of transfer to an account and/or transfer to the electronic device. The trading or bartering value of the asset may be set by the user of the electronic device, for example within the advertisement. Alternatively the server determines the trading or bartering value of the asset. For example, the server may prepare a deal and the user of the electronic device may be requested for approval of the deal.

FIG. 6*b* is a block diagram illustrating an example embodiment of a process 600B performed by an electronic device associated with a desired stored value asset to be purchased or acquired in exchange with another asset. At block 601B, the electronic device scans and/or searches for other devices in proximity. Other devices may also be detected based on location, for example, through a service keeping track of the location of different devices and/or respective users. If no device is detected at block 602, the electronic device may continue scanning and/or searching for other devices. If another device is detected at block 602B, the user of the electronic device, or an entity associated with the electronic device, may then be notified of a potential transaction with the detected device at block 603B. The notification may be based on checking by the electronic device information received from detected device and determining the potential transaction. Alternatively, the electronic device may send an identifier associated with the detected device to a server 101 and receive a response from the server 101 indicative of the potential transaction. At block 604B the transaction is initiated, for example, based on approval from user of electronic device. The transaction may also be initiated automatically by the electronic device and/or the server 101. Once the transaction is made, payment is made and stored value asset, and/or a corresponding redemption identifier, is/are received electronically or transferred to an account associated with the user of the electronic device at block 605B.

According to an example embodiment, a module associated with server 101 and referred to as value engine is configured to set a trading and/or bartering value of a stored value asset. For example, the value engines estimates a fair market value of an asset available for trade or desired for purchase. The asset may be, for example, associated with a detected device and/or a respective account, stored in a database including an inventory of stored value assets, and/or the like. The value engine may determine the value of the asset from a list associated with the asset. Alternatively, the value engine determines a value based on one or more of:
  recent trades, a search of related products on the Internet, and/or other similar price determination approach,
  a fair market satisfying criteria specified by two entities involved in a potential transaction,
  a deal that satisfies the minimum and maximum values associated with an electronic device user desiring to purchase, sell and/or barter the asset,
  on the minimum and maximum values associated with similar assets that are desired and/or available for sale or bartering, and/or
  a proposed deal or transaction that balances the values of assets to be exchanged between tow entities, for example, with a pre-determined tolerance, wherein such tolerance may be determined by the minimum and/or maximum values of the assets to be exchanged.

The value engine may determine a value of a specific asset, e.g., a gift card, a balance on a reward card and/or prepaid card, a coupon, and/or the like, based in part on one or more of:
  the remaining value/balance of the asset,
  the expiration date of the asset or balance thereof, and/or
  a redeemable location of that asset with respect to the potential acquirer's, and/or current owner's, location, and/or
  consumer behaviors and the probability that a specific individual may use the asset.

For example, a coupon for a store that an individual won't use because of the distance to the store may be of low value to that individual. The same coupon may be of substantial value to another individual in the proximity of the store. Similarly, a card and/or coupon associated with an establishment is of greater value to frequent customers of the same establishment.

FIG. 7 is a block diagram illustrating an example embodiment of a value engine process 700. At block 701, a request for a deal is received and/or determined. Such request may be received from a client device. Alternatively the request may be initiated by the server 101, for example, upon determination of a potential transaction between to entities. At block 702, the value engine determines a trade value for the asset(s) to be traded and/or exchanged. The trade value is determined, for example based one or more criteria such as a balance associated with the asset, location of one of the, or both, entities involved in the potential transaction, probability of potential use of asset by one of the, or both, entities involved in the potential transaction, a time interval until a value affecting event, specified parameters by both, or one of the, entities involved, and/or the like. At block 703, the value engine determines whether a proposed deal satisfies auto execution criteria. If the proposed deal does not satisfy auto execution criteria, both or one of the entities involved are/is informed of the proposed deal at block 704A and an approval is received to execute transaction. The value engine may also send alternative proposed deals for selection by a user of a client device.

In case the proposed deal satisfies auto execution criteria at 703, or approval to execute transaction is received at 704B, the value engine then passes transaction to an execution engine to execute the transaction at block 705. At block 706, the execution engine executes the transaction and delivers the asset, or makes it available, to respective entity/entities. Delivering an asset may include balance transfer, rights transfer, account number transfer, asset transfer, transfer of a redemption identifier, and/or the like. With regard to the auto execution criteria associated with block 703, the criteria may be whether other potential deals are to be sent to a client device user, for example, or the value engine can simply select one deal for user. Other criteria may be employed in this context such as determined deal value, rating of both or one of the entities involved and/or the like.

According to another example embodiment, a client application running on a client device may interact with the server over a wireless link, for example, upon determining that the client device is located inside or near an establishment. For example, the client application may request information on whether any stored value assets, e.g., cards, and/or coupons, are available for trade or purchase under specific terms and instructions. Alternatively the client device may simply notify the user, asking if the user would like to know if deals are available, and potentially ask for how much purchase value they would like to have for use in the establishment. For example, a potential transaction may be based upon a single user's card value being offered or a plurality of cards with different values being offered for sale or trade.

Following the user of the mobile device entering a desired value, and/or value range, the valuation engine on the server 101 will receives the value along with range values for permissible transaction execution. The valuation engine will compare the request with a number of offers, which may be construed as bids. The offers will be paired with the request in such a way as to attempt to match the requested vale, for example, as closely as possible. The value determined for each individual offer may be determined by a first minimum discount, for example, on a card retained balance, e.g., 25% less than the remaining balance. Additionally other discount rates may be applied based upon how much time left for redemption of the asset prior to expiration. For instance, if 6 months are left there may be little or no discount, but if only an hour or a day is left prior to a reduction or expiration of a card, a coupon, a remaining balance, and/or a voucher, an additional 25% discount may be applied in terms of value of the offered asset. In such a case the discount value may be a mathematical function based upon time left until value reduction, the amount of reduction in value, distance to redemption location, and/or a probabilistic determination of the likelihood of offer to be taken and/or asset to be used. A value modification factor may also be applied for the case where a deal is very close, but the valuation engine may not find a match. For instance, if a plurality of cards were being merged into a single transaction allowing for one redeemable value, a value premium may be provided for one or more of the cards to allow the transaction to move forward.

Note that in the case of a value affecting time event, the asset value may decline over time as a value reduction event nears. As such, specific value thresholds may trigger messages to the offering entity of the asset, providing reminders, incentives, or other motivations such as special discounts for other services or products, or increase rewards values associated with the use of this or another service. Examples where there is a value reduction event include electronic tickets for a show, a sports event, parks' tickets, movie passes, a two for one coupon, and/or the like. Other factors may also be considered when determining the current value of an asset being offered, including location. For instance if a gift card is for a merchant, a retailer, and/or restaurant not in a first individual area, but is useful for a second individual in another area, a discount value may be applied, based upon the history of the first individual's purchases with the service, or based upon his registered address, the location history of his mobile device when used with this service.

The rules or constraints provided by the owner of the asset, together with the valuation of the asset, may allow for the deal to proceed if the determined value is within an allowable range, or above a minimum specified by the owner of the asset. In such a case the deal is automatically approved, and then passed to the execution engine, assuming automatic approval by all other participants. In cases where automatic approval constraints are not met, a message may be sent to the owner or the requestor of the asset, requesting explicit approval of the deal. Once the deal has been approve the execution engine will transfer all values, assets, account numbers, and other required currencies or balances as needed to complete the transaction, in this embodiment. The client device will, in one embodiment, receive one or more credit card or gift card numbers, and store them as being available for use in subsequent purchase. It is contemplated that the total value of the redeemable assets received during the transaction would be in excess, for example by a minimum amount, of the value provided in exchange to make the deal compelling to all entities involved.

For example, a user of device A in a store expects to spend $100, the device having detected presence in the store requests and receives the $100 figure as a request for the gift card. Additionally, the user has entered a maximum they will pay, e.g., $75, for the received value that is at least 25% discount on the purchase. The device passes that value and potentially the constraint to the server 101, operating the valuation engine. The valuation engine then determines 3 cards that meet this requirement. The parameters associated with each car are as follows: (1) Card A has a balance of 60$. The 25% minimum discount is applied, plus a transaction discount of 10% for the use of the service. The maximum the service can offer for that car is $60*(1−0.25)*(1−0.1) =$40.50. This deal does not meet the $100 value request from the user of device A. However, the same deal may be paired with another card to make the transaction automatically approved. If the minimum value constraint provided by the seller of this card is a maximum discount of 25%, e.g., minimum selling price of $45, the potential transaction does not satisfy the seller's constraints for automatic approval, and is not authorized or considered further unless required. (2) Card B has a $100 balance. Applying the same discount parameters results in a value of 100*0.75*0.9=$67.5. The seller of this card, for example, has authorized a minimum sale price of $60 for automatic approval. As such, this card is a candidate for the transaction. (3) Card C has a $100 balance. Applying the same discount parameters results in a value of 100*0.75*0.9=$67.5. This card expires in 2 days and the seller has approved an additional discount of 20%. This results in value of $54 to the seller of Card C. Having approved these values, the deal meets the requirements for automatic approval.

Based upon two cards meeting the requirements, and no combination of cards meeting the requirements as a single "deal" candidate, the valuation engine is set up to provide for the best discount to the purchaser of the card, rather than the sellers, in this case. Therefore, the Card C offer is selected for a transaction with Device A. The deal is automatically approved, and executed, and notifications are passed to all entities involved, and values are transferred. In this example the user of device A paid 54$ for the card value, and an additional 10% of the card value for the service transaction fee for a total cost of $64, in return for a $100 gift card, resulting in a 36% discount for their purchase. The seller of Card C received $54 for a $100 balance which was unlikely to be used given the expiration date being within two days. In this case the service retains 10% of the value or a $10 transaction fee.

Alternatively the valuation engine may be set to optimize the value received by the seller rather than the purchaser and would have selected Card B instead. In this case Card B would have been transferred, and the seller received $67.5, while the user of device A would receive a $100 card for $75 per the deal constraints. The service would retain the difference of $7.50 for the transaction fee. The described model may be applicable to restaurant gift cards and/or coupons, tickets for events and/or the like particularly where expiration dates are involved. The specified discount parameters are specified as examples only and not meant to constrain any scope of what is claimed herein.

In some embodiments, it may also be the case that the server is capable of invalidating the transferred card and/or account numbers, and issuing new card/account numbers to the receiving device. Alternatively the values may simply be transferred using automated clearing house (ACH) mechanisms, balance adjustments, charges to the card as is normal in the practice of performing a purchase, credits to other cards, and/or the like. Additionally if the actual card number must be transferred, the selling entity may have to provide another credit card with authorization to check that card for any discrepancies with the value transferred, based on subsequent use after transfer, or simple error in balances or expiration dates. upon execution of such a deal or trade, one or more of the account numbers, and other required credentials would be transferred to the users mobile device for use in redemption at the point of sale in the retail store immediately. Such a transfer may be used as one consolidated account, or as several, or many individuals' accounts for use concurrently or separately. Alternatively, no account numbers may be transferred, only a value provided to the account balance in an existing account already known to the device.

Figure 8:
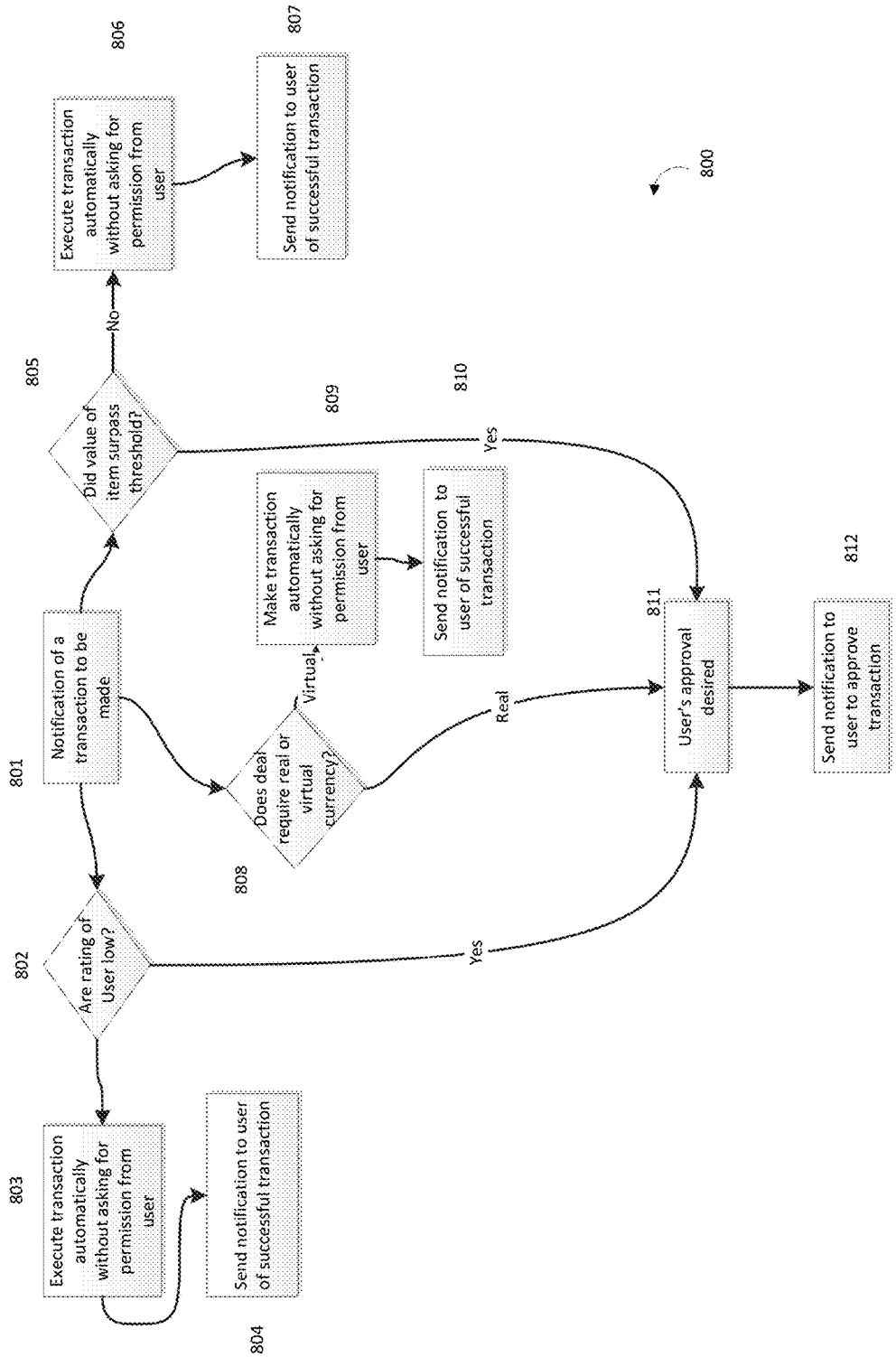
FIG. 8 illustrates an example embodiment of a trade, or execution, engine process.

FIG. 8 is a block diagram illustrating an example embodiment of a trade, or execution, engine process 800. At block 801, the trade engine is notified of a transaction to be executed. The trade engine employs one or more criteria to determine whether a client device user is to be asked for approval before execution of the transaction. Such criteria may include, for example, rating of an entity involved in the transaction, transaction value, whether real or virtual currency is to be transferred, and/or the like. FIG. 8 shows different embodiments of how to employ such criteria. For example at block 802, only rating of an entity involved in transaction is checked and if found to be high, the transaction is executed automatically at 803 and notification of successful execution is sent to the user of the client device at 804. Alternatively at 805, only transaction value is checked, for example, against a threshold and if found to be lower than threshold, the transaction is executed automatically at 806 and notification of successful execution is sent to the user of the client device at 807. At 808, the trade engine checks whether transaction involves transfer of real currency or virtual currency. If transaction involves the transfer of virtual currency, the transaction is executed automatically at 809 and notification of successful execution is sent to the user of the client device at 810. In the cases where the other entity's rating is low, transaction value is larger than the threshold, or the transaction involves transfer of real currency, the trade engine determines at 811 that the user's approval is to be requested and sends a request for approval at 812. The examples provided in FIG. 8 are simply for the purpose of illustration and are not to be interpreted as limiting the scope of the embodiments described. For example the trade engine may require that more than one criterion be satisfied in order to pass to automatic execution. In another example, other criteria may be used as an alternative or in combination with the criteria described in FIG. 8.

According to other example embodiments, the trade engine is configured to interface with another online service, e.g., a digital rights management (DRM) service to affect the transfer of rights associated with a specific transaction. Alternatively, the trade engine may provide for the storing of digital rights associated with a transaction. The trade engine is also configured to notify both or one of the entities once the transaction is completed. The trade engine may also be configured to automatically log to a user's account and exchange the assets to be traded automatically for each user. For example, if traded assets are associated with a game, e.g., user A wants to trade his battle ax and user B has that item as one of the desired items his/her shared list, the trade engine may access both accounts to execute transfer of digital items. User B will find the item added to his account upon logging in.

A transaction or a deal may be authorized to proceed explicitly where a user specifically provides input to allow for approval for a transaction to occur. Alternatively, the transaction may be authorized implicitly where the user already agreed to or otherwise provided rules by which the server or other processor is allowed to authorize the execution of a transaction. Example parameters that may be provided as criteria for automatic execution include one or more of:

minimum selling price/maximum purchase price minimum and/or maximum sale/purchase/exchange value provided by value engine time dependent values, for instance time left on a redeemable coupon, minimum selling value over time for implicit approval percentage or fixed value amount above or below a fair market value, determined by value engine, for a specific transaction, a feedback rating for a party in a potential transaction, e.g., if their rating is above a level such as 4 starts, automatically proceed otherwise require explicit approval, and/or the type of item to be involved in transaction, or the number of items in the transaction.

For example, an owner of a card has remaining balance of $X. The owner may not use it, so he puts it on sale on the service with the following rules:

Implicit approval by the card owner

Max discount=70%

Min discount=30% detection by value engine vs. value on card and expiration date

A potential purchaser is walking into a specific retail establishment, such as Lowes, and his smartphone detects that they are near or in the store. The server 101 is notified based on detection, or on a user's request. The user's request may also include an amount he wishes to have on a card and/or the amount he wishes to pay for the card. The server determines a match prepares a proposed deal. The deal may be a single, or combination of cards from a single or multiple peer participants. The server 101 then sends proposed deal to the user, whose payment approval is sent back to server 101. The user may choose to pay for the card, for example, with a combination of other cards, virtual currency, and/or DRM media, and/or the like. The trade engine executes the transaction by crediting the account of the user at the store, and sending one or more card identifiers, virtual currency, and/or DRM media to the device of the card owner and/or his account. The server also sends a notification to both entities that transaction is completed.

In redeeming an asset, a user may provide, for example, a coupon code, or a card identifier at a point of sale using one of NFC tag, displaying a two-dimensional or one-dimensional barcode displayed on a screen, using a peer-to-peer wireless protocol, using SMS, MMS, and/or email, or via Pay-pal, using an Internet connection.

In another example, a user walks into a specific establishment with his/her wireless device. A client application, running on his wireless device, detects location or proximity to establishment. The user receives notification on the wireless device that a service, e.g., a service for selling gift, reward, and/or prepaid cards, is available. The user enters amount he/she intends to spend, e.g., desired card balance. The wireless device requests exchange of information with the server 101 and/or requests a deal. The server 101 looks for one or more offers or establishment cards purchased owned by other users based on specific constraints or parameters. The value engine prepares and proposes a deal which is considered, for example, equitable to all entities involved based on deal constraints. The server 101 informs the user, for example, about the total balance available for purchase. The trade engine then performs the transaction or requests approved from parties/entities involved. Upon execution of the transaction, the user is notified and one or more card numbers or accounts with value are transferred to proximal mobile device at the establishment. The value is then redeemed by the user using NFC tags, on-screen barcode display, and/or display of one or more account/card numbers.

FIG. 9 illustrates an example embodiment of review reward process. At block 901, the server 101 notifies the service that a first user is at location and/or establishment. For example, the server 101 may detect that the first user is in a restaurant registered with a review reward service. Upon detecting that the user is willing to complete a survey at block 902, the service sends a survey to a first device of the first user. The survey may be sent using a local area link or a WWAN link by using, for example, Internet, email, SMS, MMS, and/or the like. Upon determining that the survey was completed at 904 and that the first user left the establishment at block 905, a coupon is sent to the first user at 906, for example, through his first device. Alternatively, the coupon may be stored and accessible, for example, through an online search, a website, a smart poster, electronic messages, and/or other the like. At 907, the first user advertises the coupon to other devices and at least one second device, associated with a second user, receives profile information, e.g., account or profile identifier, associated with the first user. If the second user accepts to receive coupon at 909, the coupon is then sent at 910 to the second user, for example, through the second device. At 912, the second device may also receive further information including, for example, one or more of information related to the rating of the establishment, previous reviews, a menu, and/or the like. Once the second device is detected at the establishment, at block 913, the first user is notified and/or receives a reward at 915. If it is determined that the second user used the coupon at 916, he/she may be asked to fill in a survey and/or rate the review of the first user at 917. The first user may get further rewards as a result. The action associated with block 917 may be optional.

FIG. 10 illustrates communication between a server and two electronic devices according to an example embodiment. A device A 1002 and a device B 1003 are in proximity. Device A detects device B and finds out that device B has an item of interest to the user of device A. Device A informs server 1001 that it wants to trade with device B. the server 1001 responds back with information related to Device B and its respective user, such rating(s) and/or review(s). Device A informs server 1001 of the item it wants to acquire from device B and/or of an asset to give in return. The server then informs device B of device A proposal. Upon receiving approval from device B, the server executes the transaction and transfers traded or bartered assets to respective users. It is to be noted that if transaction is to be executed automatically, based on satisfied criteria, the communications 1006, 1007A, and 1007B may be omitted.

FIG. 11 illustrates communication between a server and two electronic devices according to another example embodiment. A device A registers with the server for a coupon advertisement service and completes a survey if required. The server then sends a coupon to device A. Device A then advertises the coupon by, for example, broadcasting at least one of an account or device identifier, an establishment identifier, a service identifier, a coupon identifier, other information related to the coupon, a link related to an establishment, a picture of the establishment, the address of the establishment, and/or the like. A device B receives the broadcast information. Device b may request more information from the server, for example, regarding the coupon, the establishment, the device B and/or its respective user. The server responds back to device B with requested content which may include verification of the coupon authenticity, additional coding to allow redemption at the establishment, content related to the establishment, maps, directions traffic information, a picture of the coupon, and/or any other information. Device B may even request further information such as a request for a reservation, a request for an order to be made at the establishment, and/or the like. The server then responds back to acknowledge request of device B and/or confirms the fulfillment of the request. Once device B is in the establishment, its presence is detected and the server is made aware. The server then sends a survey to device B to be completed. The survey may be about a review of the establishment and/or a review of the review made by the user of device A. Once the server determines that the survey is completed the server may send the coupon or another coupon to device B. The server may be informed of completion of the survey based on message sent from device b, or otherwise detect the completion by accessing a survey module. The server then notifies device A that device B used the coupon and/or of reward points allocated to the user of device A. For example, the reward points may be determined based on a rating, by the user of device B, to the review of the establishment made by the user of device A.

FURTHER EXAMPLES

The following are several brief synopses of still further example embodiments.

—Exchanging/Bartering Items Such as Gift Cards

Implicit is when the bartering is automatic, there is no need of an approval by the user, unless the deal is out of bounds of pre-determined rules in which case the user will be notifies to provide explicit approval or the deal may not be done. Explicit is when the exchange is done manually and approval is always required. This also depend what the users are trading and also on the ratings of the user. A trade would be considered implicit if it consists of bartering virtual objects (for example: virtual objects in a game, music, etc), and been pre-authorized by the respective users according to some rules for the server to abide by. A trade would be considered explicit if bartering of objects that need to be physically attained like a gift card. Also when a user has a rating that is below a certain preset value then the server will automatically ask the user if he/she wants to barter with user or not.

Each user will have an account set up. The user would go online to the website and sine up and fill out the information required. The account can be combined with other accounts such using shared login information or directly in those accounts, such as iTunes, Amazon, Yahoo, Google, pay-pal, Facebook, etc. There will be an app on the mobile device that will let users connect to their account, access their information from anywhere, and modify it as necessary. Such applications may be implemented as an iPhone or Android application or "App" on a device and downloaded from a store or may be implemented as a "web app" such as typical in HTML5 or AJAX and the like, allowing for both online and offline application operation.

In one embodiment, mobile to mobile communications will be used for the detection of the peer device, allowing for the detection of two mobile devices when in proximity. Such an approach allows for the devices to detect each other when in range.

Once detected, each device will communicate with the trusted server, using an Internet connection (either via a wireless LAN, or wireless WAN), which will provide them with information about the respective other device or entity associated with the device (and respective account information if appropriate).

Information provided by the server may include their preferences. Their preferences may include for instance, a list of what they want to exchange and what their willing to barter for it. The server, in one embodiment, would compare the shared lists, determine matching items within the preferences, and only show or notify the Devices of items that they have in common, by compiling only a list that includes the items within the preferences, which match the desired items of one user to the items other user wants to barter, for instance. The users will then be notified of a candidate match of preferences, and the server can broker the transaction of the items if needed (assuming explicit notification is required for a transaction).

In another embodiment the server does not require explicit approval for a matching "candidate transaction" to occur, the exchange making it implicit bartering, or implicit transacting.

Alternatively, the deal approval process may take place in a purely peer to peer model over Wi-Fi, Wi-Fi direct, Bluetooth, or FlashLiq (by Qualcomm) like proximal links, or LAN like links. The mobile devices will do the bartering or deal trade commencement themselves, and in some embodiment using services provide by the central trusted server such as the Value Engine, and potentially the trade Engine one the deal is approved for moving forward. As such, specific aspects of the process may be performed either partially or entirely without the servers being involved.

Other aspects and embodiments may include each user having ratings relevant to feedback provided to the server, by previous peer participants, based on the participant's past performance, behavior, responsiveness, honestly, or the like. Such reviews may be provided to the current "peer" participant allowing for an indication of the history of the user and or of the items previously exchanged (where they of good quality for example). Such information may also be used directly by the server or the devices in determining preference matches. For instance, in the case where peer's desired items, and available items match, preferences may exclude a match one or more peer having too low of a rating by past participants. Alternatively, such information may be provided to a user's device and presented to the potential peer in a transaction providing them with the ability to make an informed decision as to whether to enter into a transaction with a potential peer.

In some embodiments, when users (or their devices) detect each other, (after the server retrieves associated account information, compares the preferences, determines matches, etc) each user will receive a message that will contain information about the other user including his reviews and ratings. These are made available for other users to examine before they begin bartering, or otherwise selecting or approving a proposed deal. Each user will be asked to rate the user who they traded with and the service received (was the trade fast, did the items work properly, etc) at the end of the exchange. These rating will be available to all users for inspection. The account will have settings that allow a user to either interact manually (control the trade) or chose to do the exchange automatically, where the server will do the trade without asking for permission. If the ratings of a user are below a certain level the server will may inform the user and give the option (manually ask permission) of whether to decline the paring or move forward with the exchange. Each user will have the ability to modify these options as they see fit.

User_a is walking into Starbucks

User_b is leaving Starbucks

User_a detects User_b

Both users send the information to server

Server retrieves information of User_a and User_b (regarding preferences in music, videos, movies, games, restaurants, stores, past purchase behaviors using NFC, gift cards, etc)

Server compares the information found with both users

Sends message to User_a and User_b

Notifies users that they are in proximity of each other

Sends a message to User_a that includes User_b profile, rating, and reviews (ratings and reviews are filled out by other users who have previously bartered with him/her)

This is done for User_b as well

If User_b has low ratings User_a is informed immediately by server

User_a is given the option to still do the exchange with User_b (this option can be selected in the account settings of the user account)

If no then paring is terminated

If yes then server sends another message with a list of the items User_b is willing to trade and the items he/she is searching for Server will not show User_a all the items User_b wants to trade but just the ones relevant Server composes that list by referring to the preferences of User_a so as to narrow the list to only items User_a is interested in This happens also for User_b User_b has a gift card for Starbucks with some money remaining on it and the gift card expires the following day User_b has no need for it anymore and wants to trade it (could be that he won't be able to use it again before it expires so instead of losing it he decides to barter it)

User_b places gift card on his list

User_a has Starbucks listed as one of his preferred places to go.

User_a has just been sent User_b list of items that user wishes to trade (does User_a want to trade with User_b?)

User_a sees User_b has a gift card for Starbucks

Yes User_a wants to trade (since User_a is going into Starbuck a gift card would be useful)

Server sends User_b message saying that User_a wants to trade gift card with User_b User_b looks at the list of items User_a has to offer in exchange (narrowed down by server to only thing that User_a and b have in common)

Next to each item will be displayed the value of the item in comparison to what user is trading for (refer to article on Facebook credits link below)

How will value be given to an item
  Priority
  Expiration date (when does it expire? The closer to expiration the more willing to trade item and value goes down)
  Preferences (user might be more willing to trade an item user no longer likes or needs)
  Need (how important is the item traded?)

User_b picks what he wants out of that list (examples: music, videos, movie rights User_a could even pay for it)

Server brokers transaction

User_b can give the gift card in three different ways
  Send picture of barcode
  Exchange in person Server monitors trade If exchange done in person, this can be done in many different ways including
  Server sends each user a picture
  Establishing a location to meet
  Establishing a chat to arrange meeting place
    This would help to prove identity of user before exchanging item
  The use of Wi-Fi, Bluetooth, NFC, etc for identification Server will require confirmation that the transaction has been done by both users Once confirmed server will make the items that User_b got in exchange available, a couple of ways to do that is by
  Storing items on server and User_b receives a link where he can then go retrieve them
  The server can send the files directly to the user's mobile device
  Can be downloaded to another account (for example if music or video it can be downloaded to iTunes account)

Trade is made

The users will then be asked to fill out a survey regarding the transaction the users will rate each other so that future users have an idea of who they are doing transactions with —General Example Usage Concepts:
  CARDTRADE: Location or proximity based triggering of the purchase of a gift card at a discount.
    You walk up to (Location) or into (proximity detection possibly) a Target. The detection would be performed based on the GPS, or based on detecting a transmission from the target itself (Shop kick, Skyhook, Wi-Fi detection or other). You are notified on your mobile phone that you may purchase (or trade for) a Target card for X % discount relative to the amount on the card. You agree, pay, and receive the value electronically for redemption at the store.
    You have a card you will not likely use, you offer it for sale on the service. When offer is taken, and transferred, you receive payment in the form of real currency, credits (virtual currency), or other goods.

REWARDREVIEW: Proximity based advertisement of recent reviews with the transfer of an authenticated coupon, which provides for sender rewards when used by others.

Both concepts using a valued engine to determine pricing based on value, time of expiration, how old the information is, likelihood of use, and other factors.

—Advertisement
  User sends (electronically and locally advertises) coupons advertising a business (restaurant, store, etc) and in return when other people use the coupon the user gets reward points.
  Authenticity cryptographic techniques or other identifiers may be used to allow redemption of a coupon to provide reward points or other compensation to original reviewer or advertiser. Such authenticity techniques discussed elsewhere may be used alone or in conjunction with other information fields in the coupon to determine the appropriate entity or account to reward for redemption of coupon and that no modification of fields relevant to value or process have been modified or otherwise tampered with. These techniques allow for confirmation of value of coupon, the merchant or business to whom the coupon is applicable, enforce a number of uses or time limit for application of the coupon or the service of which the coupon belongs or any financial implications as a result, or any other related information related to such a service.
  Each user would have an account that keeps track of all the points, where such points may be virtual currency or real currency; such currency being useful in other type of transaction including bartering or purchasing of goods or services.
  Each user will have an account that will be used to keep track of points user accumulates and of the ratings and reviews he has given to what restaurants. It is contemplated that is some embodiment, the review process would be a required step prior to a service authorizing a coupon for advertisement by that user, and further following their patronage of that establishment as being determined in some cases by determination of location, proximity, or access to transactional information potentially from other services (credit card, bank, Pay-pal, NFC apps on a phone retrieving such information).
  When user accumulates a certain amount of points the user receives a gift, or may use the points or credits as virtual cash depending on a specific proposed transaction.
  The exchange of the advertisement information from the first user's device can be done between mobile devices, vehicles, or between a mobile device and a vehicle.
  In one embodiment the driver (User_a) is at a local restaurant that he encountered on the road while on a trip. At the end of the meal User_a uses an application on their phone to fill out a survey of the restaurant, and the associated meal. The survey will be used to review and rate the restaurant and its service.
  When filling out the survey each user is encouraged to elaborate by adding pictures, videos, and other media files of the restaurant, its location, the servers and how they attended to the table (are they good or bad servers). Upon filling out the survey, in some embodiment User_a receives a coupon for the restaurant, which is redeemable by others, and received in some cases, as a result of proximity based detection. Such detections are efficient as the determination of proximity of one user to another, with no prior relationship. It's too cumbersome on server resources as far too may such comparisons would have to be made in order to allow for fast responsiveness of the service. If a restricted list of users is enabled for such as service, then a server based determination means of proximity based on reported GPS location is feasible depending on server resources.

However, proximity based detection has the distinct advantage of allowing for the detection to occur locally, and then the server only required to participate one the proximity is determined.

As such, a proximity based advertisement may one include an identifier of the device, or an identifier of the users account. Additionally, the advertisement may include one or more of the following: a indicator that the specific device is supporting the service, a coupon code, a coupon category (type of establishment, price range, rating level of establishment, type of food if a restaurant, etc) which may be used to further reduce matching of user's current and pre-determined interests for a coupon, and/or the review information and coupon information itself, or a link allow retrieval of any or all of the listed information, or additional content such as video or pictures.

Further the coupon information may include a Coupon authentication value. The value being generated using cryptographic techniques such as asymmetric encryption keys, or public and private encryption keys, or a hash function to be user to determine one of: the authenticity of the coupon, the origins of the coupon, and traceability of the coupon back to the provider of the review such that then may receive rewards for its use. Further, all or some of the information in the coupon may be input into an integrated check algorithm to generate a message integrity field to be included with the coupon, such that no field may be modified without invalidating the coupon. Such "MICs" are commonly used and know in the art, for instance as used in WPAN2 form the Wi-Fi alliance, or IEEE 802.11e. Such included information may be the identity of the issuer, the merchant, the reviewer, or provider of the advertisement, and any other required information to allow for the integrity of the process. Such approaches may also use secret keys for such integrity check, or public/private keys for such approaches as are known in the art.

Every time the user or someone else uses this coupon the user is awarded points, as traceable by the information in the coupon. In some cases, merchant preferences may specify that the user needs to be a certain distance away from the restaurant before he/she can start sharing the coupon received upon reviewing the restaurant. (Can't share coupon at restaurant so GPS should be involved, so as to locate the user and deny access of the coupon until he/she is a certain distance away), or after a specific time such as 5 min. later, or a combination of the two.

Once User_a leaves the restaurant he/she is allowed to share/broadcast the coupon. Other users have the choice to either accept or deny advertisement, or their device may perform a matching based on identification of attributes listed in the proximity message or retrieved from information in the proximity message which allow for the user's notification only when specific criteria are met. These may include how recently the review was, what type of establishment they visited, the location of the establishment (how far form the road, or the current user's expected path of travel) e.g. how far out of the way the establishment is, if rating, the price range, the type of food, the neighborhood details such as safety as retrieved from another database, and the like. A coupon for a significant discount may be presented to the user to entice them to visit the restaurant. Other details including the reviews of the advertisers past recommendations may be presented as well to provide an indication of how reliable their opinion is. Further only individuals bellowing to a group or list may be allowed to be matched. If accepted the users receive the coupon and the reviews and ratings of the restaurant from that user, or from other sources as well.

In another example, there may be limits as to how long ago or how distance from the restaurant that an advertisement may be matched. For instance, Users have to be no more than certain distance from restaurant so User_a cannot advertise to users that are too far away (so advertisement can only be done in a certain range from the restaurant for example between 1-10 miles).

For example: if User_a is going on a trip to Miami and he stops at a restaurant in Fort Lauderdale. User_b is driving back from Miami and is going back to Melbourne. The route each user takes will be crucial when it comes to sharing; because since User_b is going in the direction User_a is coming from he might be interested in stopping at the location. Meanwhile User_a doesn't want to share advertisements with another user who is not going in that direction. So User_a wants to broadcast to anyone that is within a certain range of the location or that has is on a route that would take user by that location. Another constraint would be at what time user would want to advertise. These are all suggestive but each individual user is not required to follow.

The coupon given to each user is unique. This means that the barcode or redeem code is only associated with User_a so he/she alone gets points when other users utilize it.

Once the users make use of the coupon a notice will be sent to User_a that informs User_a that his/her coupon has been used and will provide the amount of points that will be added to his/her account. The users who utilizes User_a's coupon will be asked to do a survey on the restaurant, as well as do a survey on the reviews given by User_a on the restaurant. Once the user does the survey on the restaurant they too will receive a coupon that they can share/broadcast. The reason to do a survey on the reviews given by User_a is to give rate User_a and how accurate his advice was. This helps other users when they see his/her review. There will be rating shown to give the users and understanding of how accurate User_a's reviews are.

action: same redemption approaches as listed before, e.g., barcode, showing the coupon on the screen, reading the code to the casher, NFC, SMS, MMS, email, and/or the like.

User_a just finished meal at restaurant

Fills out survey of restaurant

User_a will have the option to add pictures, video, and other media files to the survey The more detailed the survey the more reward point will User_a receive when the coupon is utilized Once User_a leaves the restaurant and gets a certain predefined distance away from the restaurant a coupon will be Stored on the server so that User_a can access it
Sent directly to his mobile device
Sent directly to his OBU of his vehicle
Using GPS to triangulate position of User_a in order to give permission to share coupon
User_a identifies all other users (could be other vehicles or mobile devices) in proximity (using Wi-Fi, Bluetooth, etc)
Using the server User_a send coupon to all users found
Coupon can use NFC or be a barcode or redemption code
Users have the option of filtering what advertisements to receive based on
Route user is taking
Time of day
How long ago User_a was at the location
Certain distance away from location
Each user (User_b) has the option of accepting or declining the ability to view advertisement
If granted User_b will receive a coupon with a review of the restaurant from User_a (which may include media files) and a link (or something) that will show the restaurant information as well as all reviews and ratings
If User_b decides to go to the restaurant and use coupon
User_a will receive notification of use through a hash function, public/private key, encryption (cryptographic techniques)
In message there will also be the points earned from use (maybe also show the total points earned until that moment)
Reward points will be added to User_a's account based upon
Detection
whether or not users viewed the advertisement
if the users actually went to the restaurant that User_a advertised
how long they stopped and stayed at the restaurant using GPS coordinates or Wi-Fi connection as a way of detecting if users were at the location
User_a will receive a different amount of points for each step (stated above)
For example: if User_b just opens advertisement User_a gets 2 points but if User_b goes to restaurant and uses coupon User_a gets 10 points.
After User_b is finished with meal and uses coupon, he receives
A survey on the restaurant
A survey on User_a and his/her reviews
The survey of the user will contain questions such as
how accurate was review given User_a
If User_b likes the reviews of User_a and thinks they are accurate User_a gets good ratings
If User_b doesn't think reviews were faulty (for example User_a gave good reviews so he/she could get points but in reality restaurant is not good) then User_b can give him/her bad ratings
These rating will be shown every time User_a broadcasts/shares coupon so that other users are aware of the quality of reviews User_a gives
User_b also fills out the survey of the restaurant
When survey is complete User_b gets the opportunity to advertise the coupon
This is done the same way it was done for User_a
After a certain time, distance or both advertisement stop Each user has the option of choosing
When to advertise
To whom
For how long
Where (how far away from location, etc)
The coupon may include fields or other information containing cryptographic or authenticity based information. This information is used to determine
The authenticity of coupon
The traceability to the original reviewer or advertiser
The input of the generation may include "a number used once", NONCE, the identifier for the original reviewer or advertiser, an identifier for the merchant (who would redeem the coupon), an identifier for the recipient of the coupon, and time or date based information. Any of all of these may be input in algorithm
An example of one such authenticity algorithm also includes insuring that no tampering has occurred to the message
an example of one such algorithm including one of these aspects is AES algorithm such as is described in RFC 3537, RFC 3566, RFC 3444, RFC 3602, RFC 3565, RFC 4493 the AESC MAC algorithm, and the like including CBC message authentication codes and related hash functions or other public or private key algorithms or similarly related RFCs
Additional references of that include: Various standards exist that define MAC algorithms. These include:
FIPS PUB 113 Computer Data Authentication,[4] withdrawn in 2002,[5] defines an algorithm based on DES.
ISO/IEC 9797-1 Mechanisms using a block cipher [6]
ISO/IEC 9797-2 Mechanisms using a dedicated hash-function[7]
ISO/IEC 9797-1 and -2 define generic models and algorithms that can be used with any block cipher or hash function, and a variety of different parameters. These models and parameters allow more specific algorithms to be defined by nominating the parameters. For example the FIPS PUB 113 algorithm is functionally equivalent to ISO/IEC 9797-1 MAC algorithm 1 with padding method 1 and a block cipher algorithm of DES.
These techniques can be used
Limited use
One time use
Use by only specific party
Use with specific merchants only
Use with traceability It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more procedures. A non-transitory machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the data processors described herein are intended for purposes of illustration only and not as a limitation of the embodiments.

The term server, as used in above, may refer to one or more software modules executable by one or more processors, one or more processors, one or more computer devices, or a combination thereof. In addition, the term server, as used above, should not be limited to a single computer server as the methods performed by the server may be performed by one or more computer servers.

While the above explanation has particularly shown and described example embodiments, it will be understood by those skilled in the art that various changes in form and details may be made therein without departing from the scope of the invention, as encompassed only by the appended claims.

The entire content of the U.S. application Ser. No. 12/364,897 is hereby incorporated by reference.

What is claimed is:

1. An apparatus comprising one or more computer servers to facilitate the exchange of advertisements between wireless devices, the one or more computer servers further comprising:
   at least one processor, and
   at least one memory with executable instructions stored thereon,
   the at least one memory and the executable instructions, with the at least one processor, causing said one or more computer servers to:
   send, from the one or more servers to a first wireless device in a first vehicle, advertisement related information, whereby the advertisement related information subsequently enables an advertisement transmission broadcast by the first wireless device, and to subsequently enable reception of the advertisement transmission by a second wireless device in a second vehicle;
   receive, at the one or more servers from the second wireless device, a unique identifier derived from the advertisement transmission; and
   send, from the one or more servers to the first wireless device in the first vehicle, information derived from the unique identifier, to thereby enable at least one of the first or second wireless device to determine relevance of information derived from the advertisement transmission based upon navigational information related to at least one of the first vehicle or the second vehicle and further based upon the unique identifier.

2. The apparatus of claim 1, wherein the advertisement transmission comprises the unique identifier.

3. The apparatus of claim 1, wherein the information derived from the advertisement transmission includes location information.

4. The apparatus of claim 1, wherein the advertisement related information includes user preferences for use in determining the relevance of the information derived from the advertisement transmission, and further wherein navigation information used to determine relevance is a planned route of at least one of the first or the second vehicle.

5. The apparatus of claim 4 wherein the information derived from the advertisement transmission includes location information associated with an establishment, and wherein relevance of the advertisement related information is based, at least in part, upon the planned route, the location of the establishment, or user preferences.

6. The apparatus of claim 1, wherein the information derived from the unique identifier comprises advertisement content, determined by the one or more servers in response to the reception of the unique identifier, the advertisement content including one or more of a customer review of an establishment, and a coupon for use at that establishment, an identification of the provider of the review, or a cryptographic authenticity check.

7. The apparatus of claim 1, wherein the advertisement related information includes, at least in part, user preferences for use in determining the relevance of the information derived from the advertisement transmission.

8. The apparatus of claim 1, wherein at least a portion of the information derived from the unique identifier sent from the one or more servers provides user preferences related to a user of the first vehicle, for use by the first vehicle in determining the relevance of information derived from the advertisement transmission.

9. The apparatus of claim 1, wherein the information derived from the advertisement transmission comprises location information associated with content associated with the unique identifier.

10. The apparatus of claim 9, wherein the content is one or more of a coupon or a review of an establishment.

11. The apparatus of claim 9, wherein the content is included within the advertisement related information, and is determined by the one or more servers based to upon the unique identifier.

12. The apparatus of claim 9, wherein the content is provided to the first wireless device.

13. The apparatus of claim 12, wherein the content is utilized on the first wireless device to receive a discount at an establishment associated with the advertisement related information.

14. The apparatus of claim 13, wherein upon the reception of the discount at the establishment, a reward is provided to an originator of the content, wherein the content includes a review of the establishment by the originator, and wherein the originator is a user of the second vehicle.

15. The apparatus of claim 1, wherein the information derived from the advertisement transmission includes location information and wherein the location information is compared with the navigational information to determine the relevance of information derived from the advertisement transmission, and wherein the advertisement related information includes, at least in part, user preferences for further use in determining the relevance of the information derived from the advertisement transmission.

* * * * *